(12) United States Patent
Taga et al.

(10) Patent No.: US 6,234,139 B1
(45) Date of Patent: May 22, 2001

(54) CONTROL SYSTEM FOR AN ENGINE

(75) Inventors: Junichi Taga; Michihiro Imada; Masayuki Kuroki; Masayuki Tetsuno; Kiyotaka Mamiya; Hirofumi Nishimura, all of Hiroshima (JP)

(73) Assignee: Mazda Motor Corporation, Aki-gun (JP)

( * ) Notice: Subject to any disclaimer, the term of this patent is extended or adjusted under 35 U.S.C. 154(b) by 0 days.

(21) Appl. No.: 09/252,788

(22) Filed: Feb. 19, 1999

(30) Foreign Application Priority Data

Feb. 20, 1998 (JP) .................................................. 10-038782

(51) Int. Cl.⁷ .................................................... F02B 17/00
(52) U.S. Cl. ...................... 123/295; 123/568.21; 701/104
(58) Field of Search ................................... 123/295, 305, 123/568.21, 430; 701/104, 105

(56) References Cited

U.S. PATENT DOCUMENTS

| | | | |
|---|---|---|---|
| 5,881,693 | * 3/1999 | Mizuno | 123/295 |
| 5,960,769 | * 10/1999 | Mashiki et al. | 123/308 |
| 5,979,396 | * 11/1999 | Yasuoka | 123/295 |
| 5,988,138 | * 11/1999 | Kadota | 123/305 |
| 5,992,372 | * 11/1999 | Nakajima | 123/295 |
| 6,062,190 | * 5/2000 | Nakajima | 123/295 |

FOREIGN PATENT DOCUMENTS 8-312402  11/1996  (JP) .

* cited by examiner

*Primary Examiner*—Willis R. Wolfe
*Assistant Examiner*—Arnold Castro
(74) *Attorney, Agent, or Firm*—Nixon Peabody, LLP; Donald R. Studebaker

(57) ABSTRACT

An engine control system for an engine equipped with a swirl control valve which is operative in operation modes different in fuel injection form according to engine operating conditions judges based on a change in an engine operating condition whether a mode shift to one operation mode to another is demanded and controls the swirl control valve so as to attain a target opening for the one engine operation mode while keeping a specific mode shift waiting until the swirl valve opening reaches a limit value permissible in one engine operation mode into which the specific mode shift is made when the swirl control valve is judged to be out of the limit value.

9 Claims, 17 Drawing Sheets

CONTROL SYSTEM FOR AN ENGINE

BACKGROUND OF THE INVENTION

1. Field of the Invention

The invention relates to an engine control system for controlling an engine to operate in different engine operation modes according to operating conditions.

2. Description of the Related Art

Typically, in order to secure engine output torque in an engine operating zone of higher engine loads and provide an improved fuel consumption in an engine operating zone of lower engine loads, it has been well known in the art to operate an engine in a plurality of engine operation modes different fuel injection form (injection timing, air-to-fuel ratio, etc.) according to operating conditions.

There have been known engine control systems which control engines of a type of injecting fuel directly into combustion chambers to operate in different combustion modies, namely a stratified charge combustion mode in which fuel injection is made in a compression stroke and stratified charge combustion is performed with a fuel mixture at a significantly higher air-to-fuel ratio, a homogeneous charge combustion mode in which fuel injection is made in an intake stroke and homogeneous charge combustion is performed with a fuel mixture it a relatively high air-to-fuel ratio, and a homogeneous charge combustion mode in which fuel injection is made in an intake stroke and homogeneous charge combustion is performed with a fuel mixture at a stoichiometric air-to-fuel ratio. Such an engine control system is known from, for example, Japanese Unexamined Patent Publication No. 8-312402. This engine control system determines a slow response group of control parameters, such as the amount of exhaust gas recirculation and a bypass intake air flow rate, on the basis of an engine load calculated based on an engine operating condition and determines a fast response group of control parameters, such as the amount of fuel injection, a fuel injection timing and an ignition timing, calculated based on a parameter related to the engine load after a correction in relation to a response delay, so as thereby to adjust control timing between the fast and slow response control parameters.

The engine control system described in the Japanese Unexamined Patent Publication No. 8-312402 is hard to have control timing for the control parameters completely adjusted. In particular, in the case where intake air flow control means such as a swirl control valve operative to regulate a swirl of intake air is employed to change an intake air flow, there is a problem that engine output torque fluctuates due to temporary aggravation of combustion during a shift between operation modes. Specifically, operation of the intake air flow control means, e.g. opening of a swirl control valve, changes according to the engine operation modes and, in consequence, during an operation mode shift, the intake air flow control means is accompanied by a delay in attaining an operated condition suitable for an engine operation mode into which the operation mode shift is made. An intake air flow condition is made contrary to a suitable condition for the engine operation mode into which the operation mode shift has been made due to the delay, which causes temporary aggravation of combustion and a change in engine output torque. Further, in the case where the engine is equipped with an exhaust gas recirculation system, exhaust gas recirculation control means such as an EGR valve is accompanied by a delay in attaining an operated condition suitable for an engine operation mode into which the operation mode shift is made, which possibly causes temporary aggravation of combustion and a change in engine output torque.

SUMMARY OF THE INVENTION

It is an objective of the invention to provide an engine control system which prevents an occurrence of aggravation of combustion and/or a change in engine output torque due to a delay in response of intake air flow control means and the like during an operation mode shift of an engine.

The foregoing object of the present invention is achieved by providing an engine control system for an engine which is operative in a plurality of engine operation modes different in fuel injection form according to engine operating conditions and has intake air flow control means for controlling an intake air flow introduced into a combustion chamber of the engine from an intake passage according to a control value thereof. The engine control system judges based on a change in the engine operating condition whether an operation mode shift to one of the engine operation modes to another of the engine operation modes is demanded, compares the control value with a limit value of the intake air flow control means permissible in the one engine operation mode when a specific engine operation mode shift between the engine operation modes is demanded, and controls the intake air flow control means so as to attain a target control value of the intake air flow control means for the one engine operation mode to which the specific mode shift is made while keeping the specific mode shift waiting until the control value reaches the limit value when the control value is judged to be out of the limit value.

According to the engine control system, while the intake air flow control means causes a change in control value to the target value for the demanded operation mode during an operation mode shift, the engine operation mode from which the operation mode shift is made lasts until the change reaches within the limit permissible in the demanded engine operation mode.

In the case where the engine is of a type injecting fuel directly into a combustion chamber and operative in a stratified charge combustion mode in which fuel injection is made in a compression stroke and stratified charge combustion is performed and a homogeneous charge combustion mode in which fuel injection is made in an intake stroke and homogeneous charge combustion is performed, the engine control system keeps an operation mode shift to the stratified charge combustion mode from the homogeneous charge combustion mode waiting until the control value reaches the limit value for the stratified combustion charge mode when the control value is judged to be out of the limit value. This prevents an insufficiency of intake air flow due to a delay in response of the intake air flow control means during an operation mode shift the stratified charge combustion mode from the homogeneous charge combustion mode.

The engine control system may desirably execute an operation mode shift to the homogeneous charge combustion mode from the stratified charge combustion mode when the control value is judged to be out of the limit value for the homogeneous charge combustion mode and continuously performs a correction of ignition timing until the control value reaches the limit value. In events where the control valve of the intake air flow control means is changed with a delay during the operation mode shift to the homogeneous charge combustion mode from the stratified charge combustion mode, it is easy to cause an over ignition timing advance due to unnecessarily strong intake air flow. in such an event, the over ignition timing advance can be redressed by a correction, the operation mode shift is executed without being retarded.

The engine control system may incorporate exhaust gas recirculation control means such as an EGR valve for controlling an amount of exhaust gas admitted into the intake air flow as the intake air control means. In this instance, the engine control system compares a control value of the exhaust gas recirculation control means with a limit value of the exhaust gas recirculation control means permissible in the one engine operation mode when a specific operation mode shift between the engine operation modes is demanded, and controls the exhaust gas recirculation control means so as to attain a target control value of the exhaust gas recirculation control means for the one engine operation mode to which the specific operation mode shift is made while keeping the specific mode shift waiting until the control value reaches the limit value when the control value is judged to be out of the limit value. The engine control system is able not only to deal with a delay in response of the exhaust gas recirculation control means but to appropriately restrain the operation mode shift according to the delay.

According to another embodiment of the invention, an engine control system is applied to an engine equipped with exhaust gas recirculation control means for admitting an amount of exhaust gas controlled according to a control value thereof into an intake air flow introduced into a combustion chamber of the engine and operative in a plurality of engine operation modes different in fuel injection form according to engine operating conditions. The engine control system judges based on a change in the engine operating condition whether a mode shift to one of the engine operation modes from another is demanded, compares the control value with a limit value of the exhaust gas recirculation control means permissible in the one engine operation mode when a specific mode shift is demanded, and controls the exhaust gas recirculation control means so as to attain a target control value of the exhaust gas recirculation control means for the one engine operation mode to which the specific mode shift is made while keeping the specific mode shift waiting until the control value reaches the limit value when the control value is judged to be out of the limit value.

According to the engine control system of this embodiment, while the exhaust gas recirculation control means causes a change in control value to the target value for the demanded operation mode during an operation mode shift, the engine operation mode from which the operation mode shift is made lasts until the change reaches within the limit permissible in the demanded engine operation mode.

In the case where the engine is of a type injecting fuel directly into a combustion chamber and able to be operative in a stratified charge combustion mode in which fuel injection is made in a compression stroke and stratified charge combustion is performed and a homogeneous charge combustion mode in which fuel injection is made in an intake stroke and homogeneous charge combustion is performed, the engine control system keeps a specific mode shift to the homogeneous charge combustion mode from the stratified charge combustion mode waiting when the control value of the exhaust gas recirculation means is judged to be out of the limit value of the exhaust gas recirculation means. The engine control system prevents aggravation of combustion due to an excess of exhaust gas recirculation which is caused by a delay in response of the exhaust gas recirculation means during an operation mode shift from the stratified charge combustion mode which allows a relatively large amount of exhaust gas recirculation to the homogeneous charge combustion mode which allows only a reduced amount of exhaust gas recirculation. In this instance, the engine control system may execute an operation mode shift to the stratified charge combustion mode from the homogeneous charge combustion mode when the control value is judged to be out of the limit value for the stratified charge combustion mode and continuously performs a correction of ignition timing until the control value reaches the limit value. That is, since the amount of exhaust gas recirculation changes on the smaller side with respect to a target amount of exhaust gas recirculation for the stratified charge combustion mode when there is a delay in response of the exhaust gas recirculation control means during the operation mode shift to the stratified charge combustion mode from the homogeneous charge combustion mode, engine out put torque is controlled by correcting an ignition timing without keeping the operation mode shift waiting.

According to still another embodiment of the invention, the engine control system is applied with an injecting fuel directly into a combustion chamber and an engine equipped with exhaust gas recirculation control means for admitting an amount of exhaust gas controlled according to a control value thereof into an intake air flow introduced into a combustion chamber of the engine, and is operative in at least a stratified charge combustion mode in which fuel injection is made in a compression stroke and stratified charge combustion is performed with a lean fuel mixture and a lean homogeneous charge combustion mode in which fuel injection is made in an intake stroke and homogeneous charge combustion is performed with a fuel mixture enriched more than the fuel mixture with which the stratified charge combustion is performed but lean more than a stoichiometric mixture according to engine operating conditions. The engine control system judges based on a change in the engine operating condition whether a mode shift to one of the engine operation modes from another of the engine operation modes is demanded, compares the control value with a limit value of the exhaust gas recirculation control means permissible in the one engine operation mode when the mode shift is demanded, and controls the exhaust gas recirculation control means so as to attain a target control value of the exhaust gas recirculation control means for the one engine operation mode to which a specific mode shift is made while keeping the specific mode shift waiting until the control value reaches the limit value when the control value is judged to be out of the limit value.

According to the engine control system of this embodiment, when there is a delay in response of the exhaust gas recirculation control means during an operation mode shift to the homogeneous charge combustion mode from the stratified charge combustion mode, the permissible extent of an admitted amount of exhaust gas is increased due to an lowered air-to-fuel ratio, securing combustibility and enabling engine output torque to be controlled appropriately through an ignition timing correction.

BRIEF DESCRIPTION OF THE DRAWINGS

The foregoing and other objects and features of the present invention will be clearly understood from the following detailed description of preferred embodiments when read in conjunction with the accompanying drawings, in which.

DETAILED DESCRIPTION OF THE PREFERRED EMBODIMENT

Figure 1:
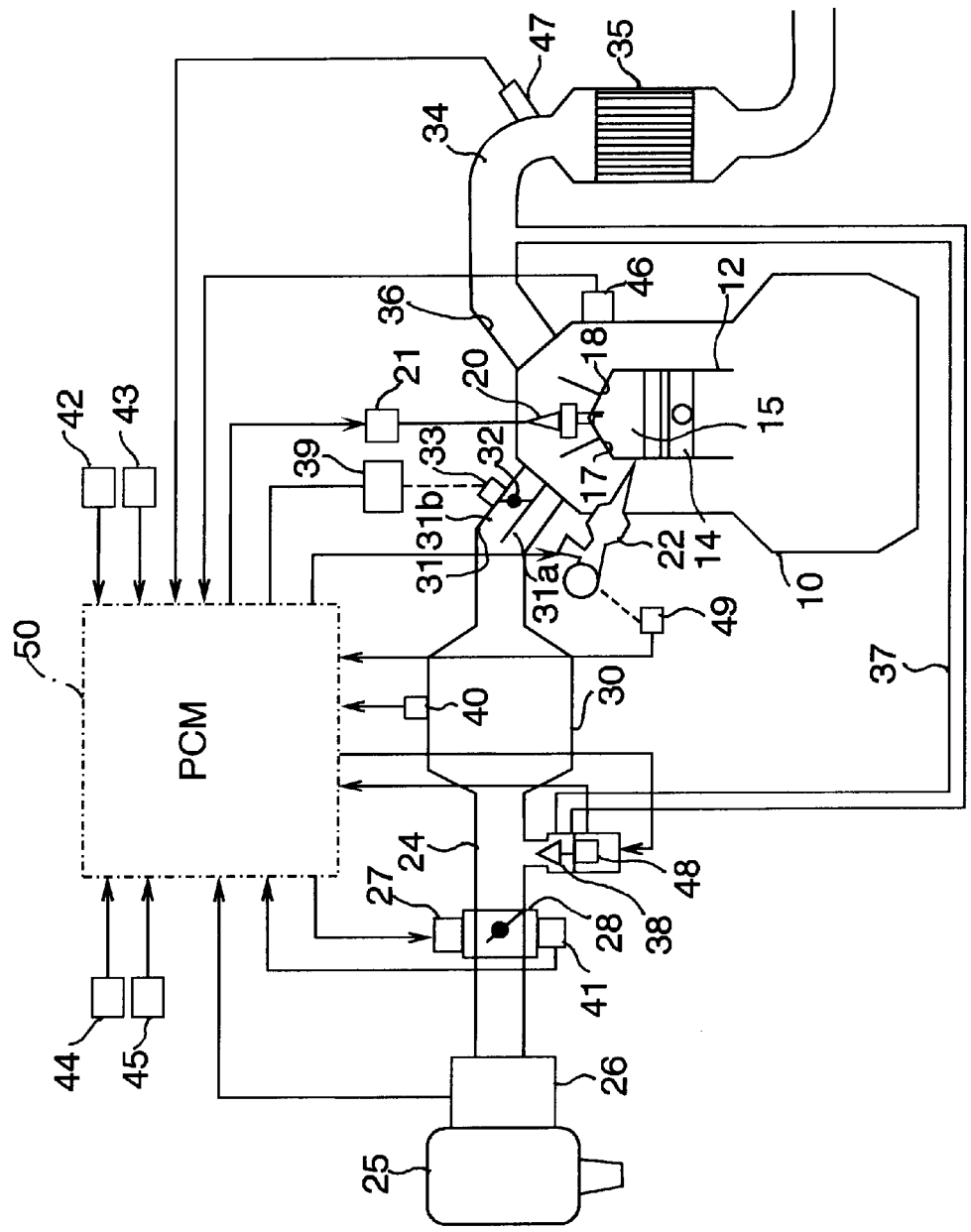
FIG. 1 is a schematic illustration of an engine control system in accordance with an embodiment of the invention.

Referring to the drawings in detail and, in particular, to FIG. 1 schematically illustrating an engine control system in accordance with an embodiment of the invention which is adapted to be suitable for, for example, a direct injection-spark ignition type of engine, a direct injection-spark ignition type of engine (which is hereafter referred to as an engine for simplicity) 10 has a plurality of cylinders 12 in which pistons 14 slide. Each cylinder 12 has a combustion chamber 15 formed above the top of the piston 14 and is provided with two intake ports (not shown) and two exhaust ports (not shown) opening into the combustion chamber 15. The intake port and the exhaust port are opened and shut at a predetermined timing by an intake valve 17 and an exhaust valve 18, respectively. The cylinder 12 at its center is further provided with a spark plug 20 extending down into the combustion chamber 15. A fuel injector 22 is located so as to inject fuel directly into the combustion chamber 15 from the inner side wall of the cylinder 12. The fuel injector 22 is connected to a fuel system (not shown) including at least a high pressure fuel pump and a pressure regulator. The fuel system provides specified fuel pressure higher than an internal pressure of the cylinder 12.

The engine 10 has an intake pipe 24 and an exhaust pipe 34. The intake pipe 24 is provided with an air cleaner 25, an air flow sensor 26, a throttle valve 28 driven by a motor 27 and a surge tank 30 arranged in order from the upstream end. The intake pipe 24 is connected to the engine through a manifold 31 having discrete pipes in communication with the respective intake ports of the respective cylinders 12. The each discrete pipe is divided into two pipe sections, namely a first discrete pipe section 31a and a second discrete pipe section 31b opening into the intake ports, respectively, of each cylinder 12. A swirl control valve 32 is installed in the second discrete part section 31b and is driven by an electrically controlled actuator 33 to open and close. While the actuator 33 drives the swirl valve 32 to close the second discrete part section 31b, an intake air flow flowing through the first discrete pipe section 31a generates a swirl in the combustion chamber 15. As the actuator 33 drives the swirl valve 32 to gradually open the second discrete part section 31b, the swirl is gradually made weak. The exhaust pipe 34 is connected to the engine through an exhaust manifold 36 having discrete pipes in communication with the respective exhaust ports of the respective cylinders 12. An exhaust gas purifying catalyst 35 is installed in the exhaust pipe 34. The exhaust gas purifying catalyst 35 is of the type which lowers an emission level of nitrogen oxides (NOx) even under learn burn state. For example, the exhaust gas purifying catalyst 35 may be of the NOx absorbing type which absorbs NOx in the exhaust gas while a lean fuel mixture is burnt and catalyzes reduction of NOx while the engine operates with a stoichiometric air-fuel mixture or an air-fuel mixture of an air-to-fuel ratio greater than the stoichiometric air-to-fuel ratio. The engine 10 is further provided with an exhaust gas recirculation system 37 between the intake pipe 24 and the exhaust pipe 30 to admit hot exhaust gas into an air flow before the surge tank 30. The exhaust gas recirculation system 37 incorporates an exhaust gas recirculation (EGR) valve 38 equipped with a valve lift sensor 48 to regulate the amount of exhaust gas admitted into the air flow in the exhaust gas recirculation system 37.

The engine 10 is equipped with various sensors besides the air flow sensor 26 and the valve lift sensor 48. The sensors includes at least a swirl valve opening sensor 39, a boost sensor 40 operative to monitor negative pressure in the surge tank 30, a throttle opening sensor 41 operative to monitor an opening of the throttle valve 28 a speed sensor 42 operative to monitor a speed of rotation of the engine 10, a position sensor 43 operative to monitor an accelerator pedal (not shown) travel, a temperature sensor 44 operative to monitor a temperature of intake air, a pressure sensor 45 operative to monitor an atmospheric pressure, a temperature sensor 46 operative to monitor a temperature of engine cooling water, an oxygen ($O_2$) sensor 47 operative to monitor an oxygen concentration of exhaust gas as an air-to-fuel ratio, and a pressure sensor 49 operative to monitor the pressure of fuel delivered to the fuel injector 22 in addition to the EGR valve lift sensor 48. The respective sensors 26 and 39–49 provide output signals representative of monitored values and send them to an engine control unit (PCM) 50 comprising a microcomputer.

The engine control unit (PCM) 50 controls the fuel injector to deliver a given amount of fuel injection at a desired timing and provides a motor control signal for the motor 27 to actuate the throttle valve 28, an ignition signal for a ignition circuit 21 to control an ignition timing, an actuation signal to control the swirl control valve 32 and a control signal for the exhaust gas recirculation (EGR) valve 38 to control the amount of exhaust gas that is recirculated.

Figure 7:
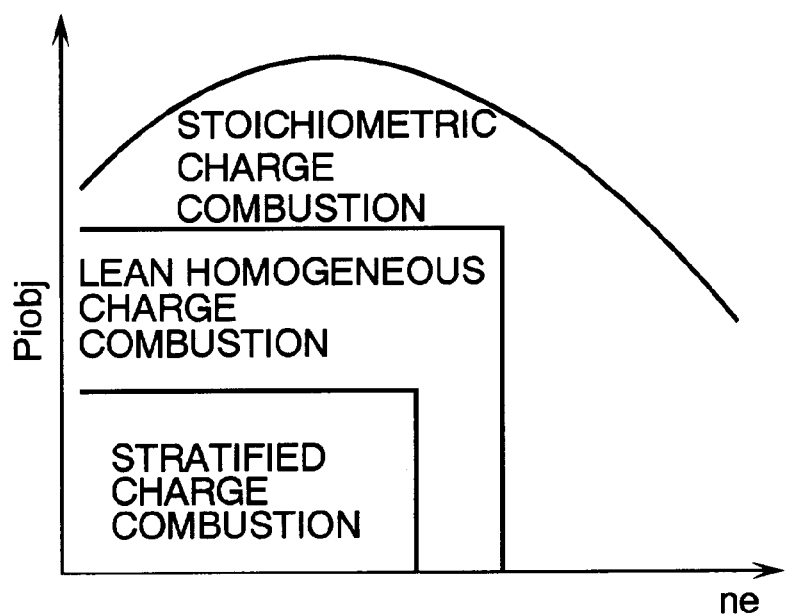
FIG. 7 is a diagram showing engine operating zones for various engine operation modes.

In the engine control for the direct injection-spark ignition engine, predetermined combustion modes in which the engine is operated with different control parameters, such as ignition timings and air-to-fuel ratios, are selected as a basic combustion mode and the basic combustion mode is changed from one to another according to engine operating conditions. Specifically, as will be described in detail later, engine operating conditions are divided into a plurality of zones, namely for example a stratified charge combustion zone for specified lower engine loads and speeds and a homogeneous charge combustion for engine loads and speeds other than the specified lower engine loads and speeds such as shown in FIG. 7. In the stratified charge combustion zone, the engine is operated in a stratified charge combustion mode in which an air fuel mixture is distributed or stratified unevenly thick around the spark plug 20 by injecting fuel in a later half of compression stroke. During operation of the engine in the stratified charge combustion mode, the throttle valve 28 is controlled to provide a great opening to increase the amount of intake air, so as thereby to distribute an air-fuel mixture with a significantly high air-to-fuel ratio, for example with an air-to-fuel ratio greater than 30, in the entire combustion chamber 15. On the other hand, in a homogeneous charge combustion zone, the engine is operated in the homogeneous charge combustion mode in which an air fuel mixture is evenly distributed in the entire combustion chamber 15 by injecting fuel in a early half of intake stroke. During operation of the engine in the homogeneous charge combustion mode, the air excess ratio λ is made greater than 1 (one), in other words, the air-to-fuel ratio is made greater than a stoichiometric air-to-fuel ratio up to, for example, 20 to 25 in a relatively lower engine load and speed zone adjacent to the stratified charge combustion zone. This mode is hereafter referred to as a lean homogeneous charge combustion mode. However, the air excess ratio λ is made equal to 1 (one), or the air-to-fuel ratio is made equal to a stoichiometric air-to-fuel ratio of 14.7 in a higher engine load and speed zone. The air excess ratio X representing the air-to-fuel ratio may be lower than 1 (one) to provide an enriched air-fuel mixture in a full throttle zone in which the throttle valve 28 fully opens or in a high engine load and speed zone close to the full throttle zone. This mode is hereafter referred to as a stoichiometric homogeneous charge combustion mode.

Figure 2:
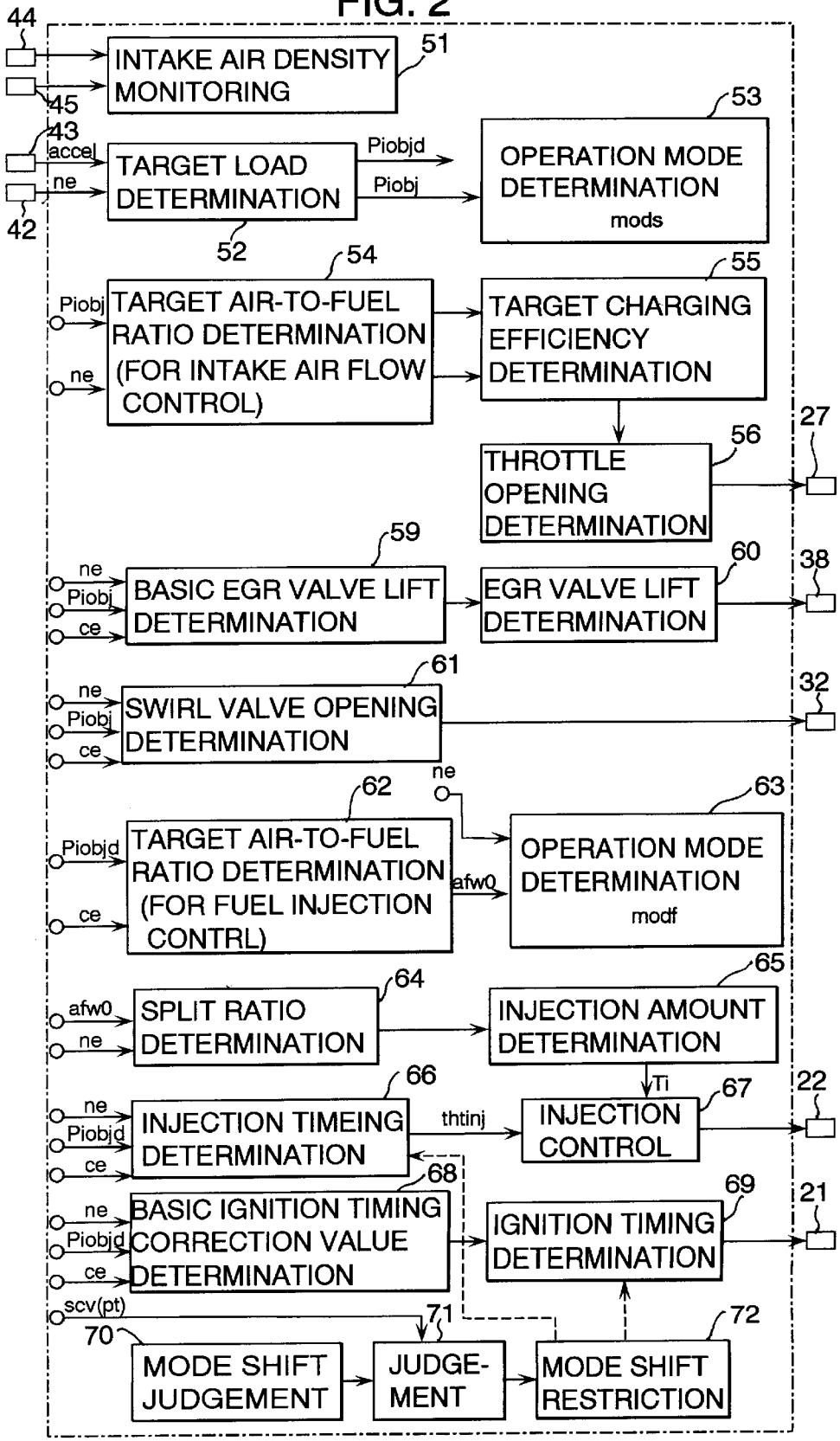
FIG. 2 is a block diagram illustrating functional structure of an engine control unit of the engine control system.
Figure 3:
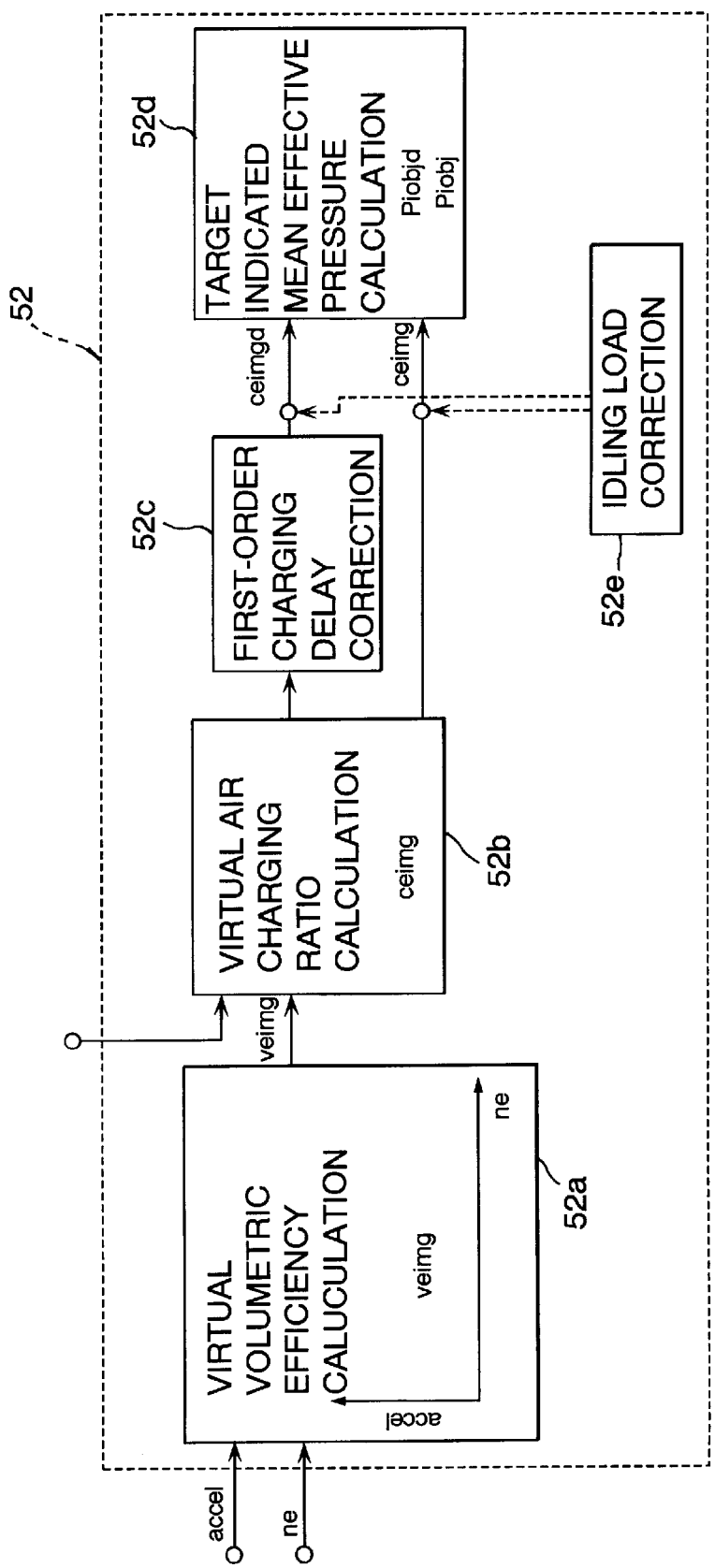
FIG. 3 is a block diagram illustrating the details of target engine load determining function.
Figure 6:
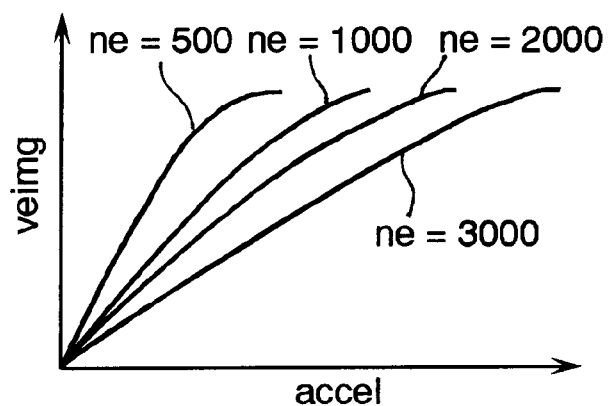
FIG. 6 is a graph showing virtual volumetric efficiency relative to acceleration pedal position for various engine speeds.

FIG. 2 is a block diagram showing a functional structure of the engine control unit (PCM) 50. As shown in FIG. 2, the engine control unit (PCM) 50 has various functional means including an intake air density monitoring means 51 operative to monitor intake air density on the basis of signals from the intake air temperature sensor 44 and the atmospheric pressure sensor 45 and a target engine load determining means 52 operative to determine a value relating to a target engine load on the basis of signals from the engine speed sensor 42 and the accelerator pedal travel sensor 43 tinged with the intake air density. As shown in detail in FIG. 3, the target engine load determining means 52 includes a functional means 52a operative to determine a virtual volumetric efficiency veimg, a functional means 52b operative to determine a virtual air charging efficiency ceimg based on the virtual volumetric efficiency veimg, a functional means 52c operative to temper the virtual air charging efficiency ceimg to determine a first-order delay corrected virtual air charging efficiency ceimgd, a functional means 52d operative to calculate a target indicated mean effective pressure Piobjd and a functional means 52e operative to correct the virtual air charging efficiency ceimg according to an idling engine load. The functional means 52a finds a virtual volumetric efficiency calculation veimg with reference to a map of virtual volumetric efficiency defined with respect to acceleration pedal travel accel and engine speed ne such as shown in FIG. 6 which is obtained from the result of bench tests and stored in a memory of the engine control unit (PCM) 50. In this instance, the virtual volumetric efficiency map is provided on the basis of the correspondence relation of virtual volumetric efficiency veimg to acceleration pedal travel accel and engine speed ne when the engine provides required output torque under a standard atmospheric pressure and a standard operating condition in which the air-to-fuel ratio remains stoichiometric. As apparent from FIG. 6 showing a virtual volumetric efficiency map, the virtual volumetric efficiency veimg increases as with a rise in accelerator pedal travel accel and, however, with a decrease in engine speed ne.

The virtual air charging efficiency determining means 52b determines a virtual air charging efficiency ceimg as an air charging efficiency meeting the required output torque under the standard operating condition by tempering the virtual volumetric efficiency veimg with the intake air density determined in the intake air density monitoring means 51. The virtual air charging efficiency ceimg is tempered as a tempered or corrected virtual air charging efficiency ceimgd in the tempering means 52c and given by the following expression (1).

$$ceimgd=(1-\alpha)\times ceimg+\alpha\times ceimgd(i-1) \tag{1}$$

where the tempered virtual air charging efficiency ceimgd followed by an affix (i−1) is the last value thereof, and α (0<α<1) is the filtering factor.

The target indicated mean effective pressure calculating means 52d calculates a first target indicated mean effective pressure Piobj according to the virtual air charging efficiency ceimg and a second target indicated mean effective pressure Piobjd according to the tempered virtual air charging efficiency ceimgd. These first and second target indicated mean effective pressure Piobj and Piobjd are given by the following expressions (2) and (3), respectively.

$$Piobj=K1\times ceimg+K2 \tag{2}$$

$$Piobjd=K1\times ceimgd+K2 \tag{3}$$

where K1 and K2 are conversion factors.

The idling load correcting means 52e determines a correction factor necessary to provide a rise in output torque according to an increase in engine load due to operation of external equipments such as an air conditioning system driven by the engine and corrects these virtual air charging efficiency ceimg and tempered virtual air charging efficiency ceimgd with the corrected according to the correction factor as target engine loads. The engine control unit (PCM) 50 further includes a functional means 53 operative to determine a basic combustion mode on the basis of both first target indicated mean effective pressure Piobj and engine speed ne. Specifically, as shown in FIG. 7, the stratified charge combustion mode is selected as the basic combustion mode while the first target indicated mean effective pressure Piobj and the engine speed ne are lower than specified lower threshold values $P_L$ and $N_L$ respectively. The lean ($\lambda$>1) homogeneous charge combustion mode is selected as the basic combustion mode while the first target indicated mean effective pressure Piobj and the engine speed ne are higher than the specified lower threshold values $P_L$ and $N_L$ but lower than specified higher threshold values $P_H$ and $N_H$ respectively. Further, the stoichiometric ($\lambda$=1) homogeneous charge combustion mode is selected while the first target indicated mean effective pressure Piobj and the engine speed ne are higher than the specified higher threshold values $P_H$ and $N_H$ respectively.

Figure 8A:
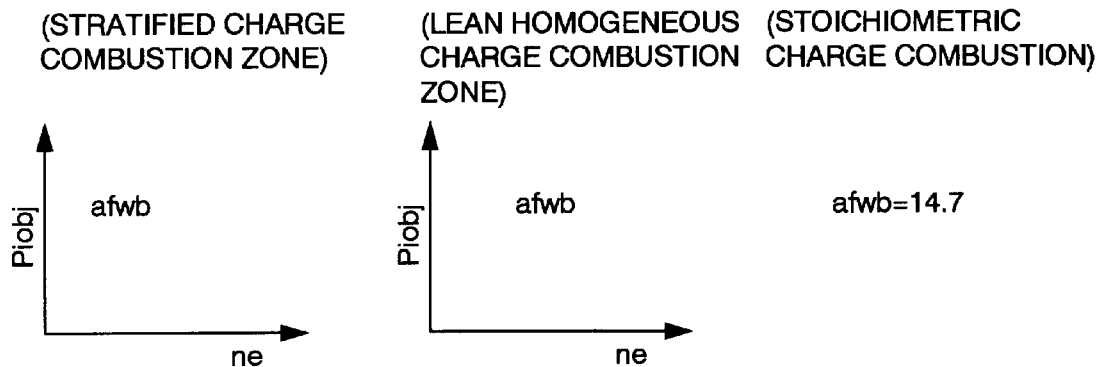
FIGS. 8A, 8B and 8C are schematic illustrations showing target air-fuel ratio control maps, basic EGR valve lift control maps and swirl control opening control maps, respectively, provided for various engine operation modes.

The engine control unit (PCM) 50 further includes functional means for determining various control parameters necessary to control output torque, such as the amount of intake air, the amount of exhaust gas that is permitted to recirculate, the strength of swirl, the amount of fuel injection, an injection timing and an ignition time, according to at least target engine load and engine speed. These engine output torque control parameters are divided into two groups, namely a slow response group and a fast response group. The slow response group of control parameters includes throttle opening tvoobj, EGR valve control value egrobj, and target swirl control valve opening scvobj which change responding to operation of the throttle valve 28, the exhaust gas recirculation (EGR) control valve 38 and the swirl control valve 32, respectively, with a time delay for which the first target indicated mean effective pressure Piobj and is employed to determine them for the control of output torque. The fast response group of control parameters includes the amount of fuel injection, an injection timing and an ignition timing which response quickly to appearance of control signals, respectively, for which the second target indicated mean effective pressure Piobjd is employed to determine them for the control of output torque. Specifically, the engine control unit (PCM) 50 includes a function of determining the amount of intake air, a function of determining the amount of exhaust gas recirculation and a function of controlling fuel injection. The amount of intake air is determined in a functional means 54 operative to determine a target air-to-fuel ratio afwb, a functional means 55 operative to determine a target air charging efficiency and a functional means 56. The target air-to-fuel ratio determining means 54 determines a target air-to-fuel ratio afwd by combustion mode determined in the basic mode determining means 53, i.e. the stratified charge combustion mode, the lean homogeneous charge combustion mode and the stoichiometric homogeneous charge combustion mode, for controlling the amount of intake air. As shown in FIG. 8A, the target air-to-fuel ratio afwd is determined according to first target indicated mean effective pressure Piobj and engine speed ne with reference to a target air-to-fuel ratio control map provided for the stratified charge combustion mode when the engine operates in the stratified charge combustion mode or to a target air-to-fuel ratio control map provided for the lean homogeneous charge combustion mode when the engine operates in the lean homogeneous charge combustion mode, or is fixed at a stoichiometric ratio of 14.7 which is represented by an air excess ratio $\lambda$ of 1 ($\lambda$=1) when the engine operates in the stoichiometric charge combustion mode.

The target air charging efficiency determining means 55 determines a target air charging efficiency ceobj based on the virtual air charging efficiency ceimg or the first target indicated mean effective pressure Piobj corresponding to the virtual air charging efficiency ceimg and the target air-to-fuel ratio afwd. The target air charging efficiency ceobj is given by the following expression (4).

$$ceobj = ceimg \times \{(afwb+K3)/14.7\} \times K4 \quad (4)$$

where K3 and K4 are fuel consumption improvement factors. The expression (4) is used to temper the virtual air charging efficiency ceimg with an air excess ratio as a factor of the target air-to-fuel ratio (afwb/14.7) and an improvement ratio of fuel consumption. In other words, while the virtual air charging efficiency ceimg is a value corresponding to a target load as assumed that the engine is operated with a stoichiometric air-to-fuel ratio, it is necessary to add to the virtual air charging efficiency ceimg an air excess ratio as a factor of the target air-to-fuel ratio when the same amount of fuel injection has to be assurred during lean-burn engine operation. When assuring the same amount of fuel injection during lean burn engine operation as during the combustion with the stoichiometric air-to-fuel ratio, the thermal efficiency during lean burn engine operation increases to improve fuel consumption. In consequence, the output torque is increased by the improvement ratio of fuel consumption as compared with that provided during the combustion with the stoichiometric air-to-fuel ratio. Therefore, in order to gain output torque balancing the target load, the virtual air charging efficiency ceimg is tempered not only with an air excess ratio as a factor of the target air-to-fuel ratio afwd but also with a factor of improvement ratio of fuel consumption. The fuel consumption improvement factors K3 and K4 are predetermined such that the target air charging efficiency is lowered by an extent matching an improvement ratio of fuel consumption.

The target air charging efficiency ceobj may be calculated from an expression including a first target indicated mean effective pressure Piobj which is obtained by substituting ceimg=(Piobj−K1)/K2 given by rearranging the expression (2) in the expression (4).

Figure 4:
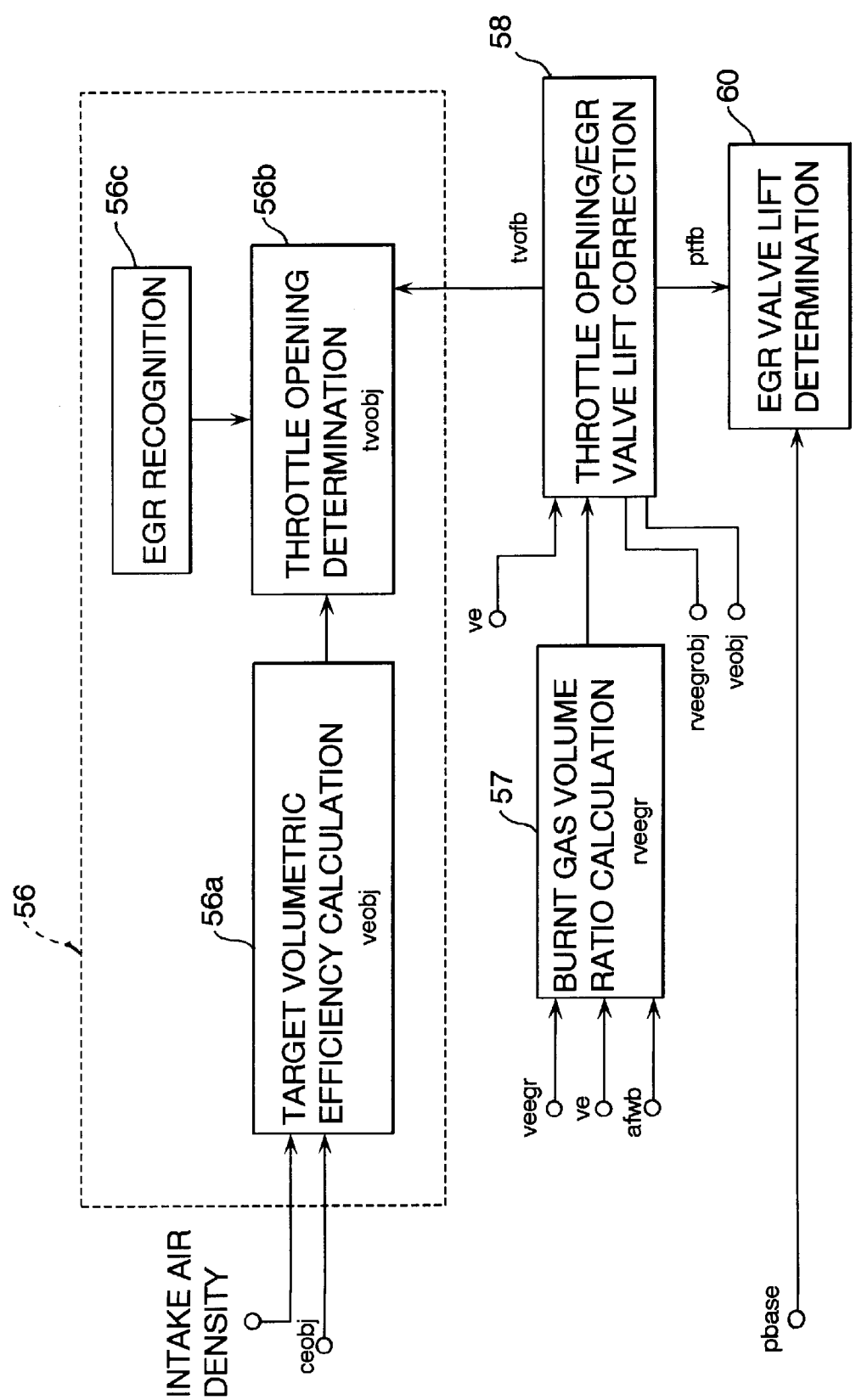
FIG. 4 is a block diagram illustrating the details of throttle opening determining function.
Figure 9:
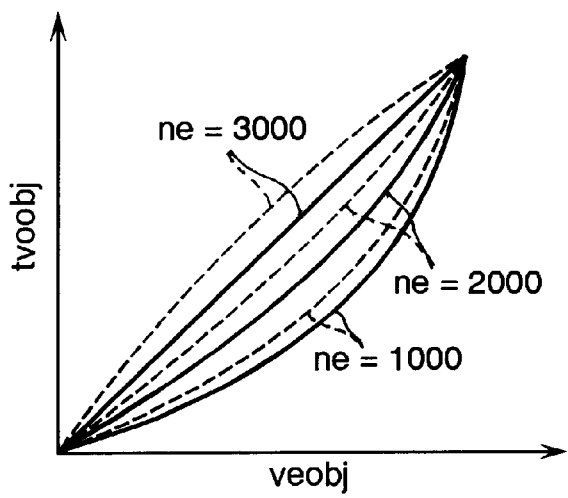
FIG. 9 is a graph showing target volumetric efficiency relative to throttle opening for various engine speeds.

As shown in detail in FIG. 4, the throttle opening determining means 56 includes a functional means 56a operative to calculate a target volumetric efficiency veobj by tempering the target air charging efficiency ceobj with the intake air density. An throttle valve opening tvoobj is determined based on the target volumetric efficiency veobj and the engine speed ne with reference to a throttle valve opening control map. In this instance, because the relationship between volumetric efficiency, throttle valve opening and engine speed is different according to whether or not the exhaust gas recirculation is made, there are provided maps specifying die relationship of throttle valve opening to volumetric efficiency, and engine speed for the cases, respectively. An exhaust gas recirculation judging means 56c judges as to whether the exhaust gas recirculation is executed or not and selects one of the throttle valve opening control maps according to the result of judgement. As shown in FIG. 9, the throttle valve opening control map selected while interrupting the exhaust gas recirculation defines control curves for various engine speeds shown by solid line, and the throttle valve opening control map selected while executing the exhaust gas recirculation defines control curves for various engine speeds shown by broken line. Both maps specify the throttle valve opening tvoobj such that it changes greater with an increase in target volumetric efficiency veobj and with a rise in engine speed ne and that it is greater while executing the exhaust gas recirculation than while interrupting the exhaust gas recirculation. As is known, exhaust gases produced from combustion of a lean air-fuel mixture during engine operation in, for example, the stratified charge combustion mode and recirculated contain not only combustion gases but also a large amount of air or oxygen ($O_2$) and the air content of exhaust gases affects the amount of air or oxygen ($O_2$) introduced into the combustion chamber 15. For this reason, in this instance, the engine control unit (PCM) 50 incorporates a burned gas volume ratio calculating means 57 and a throttle valve opening/EGR valve lift correcting means 58 to determine a correction value tvofb for the opening of throttle valve 28 and a correction value ptfb for the amount of exhaust gas recirculation to be admitted into an air flow. In the throttle valve opening/EGR valve lift correcting means 58, the throttle opening is corrected based on the result of a comparison of the burned gas volume ratio rveegr obtained in the burned gas volume ratio calculating means 57 with a target burned gas volume ratio rveegrobj and a comparison of the actual volumetric efficiency ve obtained based on an output from the air flow sensor 26 with the target volumetric efficiency veobj. In relation with the corrected throttle opening, a correction of EGR valve lift is made. The target burned gas volume ratio rveegrobj is determined with reference to a map similar to a map of basic EGR valve lift control map which will be described later.

Figure 8B:

A basic EGR valve lift determining means 59 is incorporated besides the EGR valve lift determining means 60 to determine an eventual EGR valve lift which the amount of exhaust gas recirculation depends upon. The basic EGR valve lift determining means 59 determines a basic EGR valve lift pbase for each of the combustion modes determined in the basic combustion mode determining means 53. As shown in FIG. 8B, the basic EGR valve lift pbase is determined according to first target indicated mean effective pressure Piobj and engine speed ne with reference to a basic EGR valve lift control map provided for the stratified charge combustion mode when the engine operates in the stratified charge combustion mode, or is fixed at 0 (zero) when the engine operates in the lean homogeneous charge combustion mode, or is determined according to actual air charging efficiency ce obtained based on an output from the air flow sensor 26 and engine speed ne with reference to a basic EGR valve lift control map provided for the stoichiometric homogeneous charge combustion mode when the engine operates in the stoichiometric homogeneous charge combustion mode. Further, the EGR valve lift determining means 60 tempers the basic EGR valve lift pbase with the correction value ptfb to determine a target EGR valve lift egrobj. The EGR valve 38 is controlled to attain the target EGR valve lift egrobj.

Figure 8C:
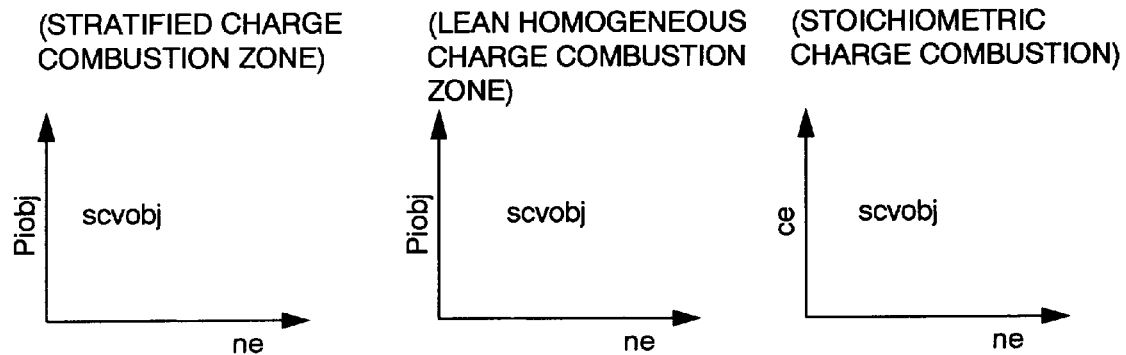

The engine control unit (PCM) 50 further includes functional means 61 operative to determine a target opening of the swirl control valve 32 necessary to provide required strength of a swirl by combustion mode determined in the basic combustion mode determining means 53. Specifically, as shown in FIG. 8C, the target swirl control valve opening scvobj is determined according to first target indicated mean effective pressure Piobj and engine speed ne with reference to a swirl control valve opening control map provided for the stratified charge combustion mode when the engine operates in the stratified charge combustion mode or to a swirl control valve opening control map provided for the lean homogeneous charge combustion mode when the engine operates in the lean homogeneous charge combustion mode, or is otherwise determined according to actual air charging efficiency ce and engine speed ne with reference to a swirl valve opening control map when the engine operates in the stratified charge combustion mode.

Figure 5:
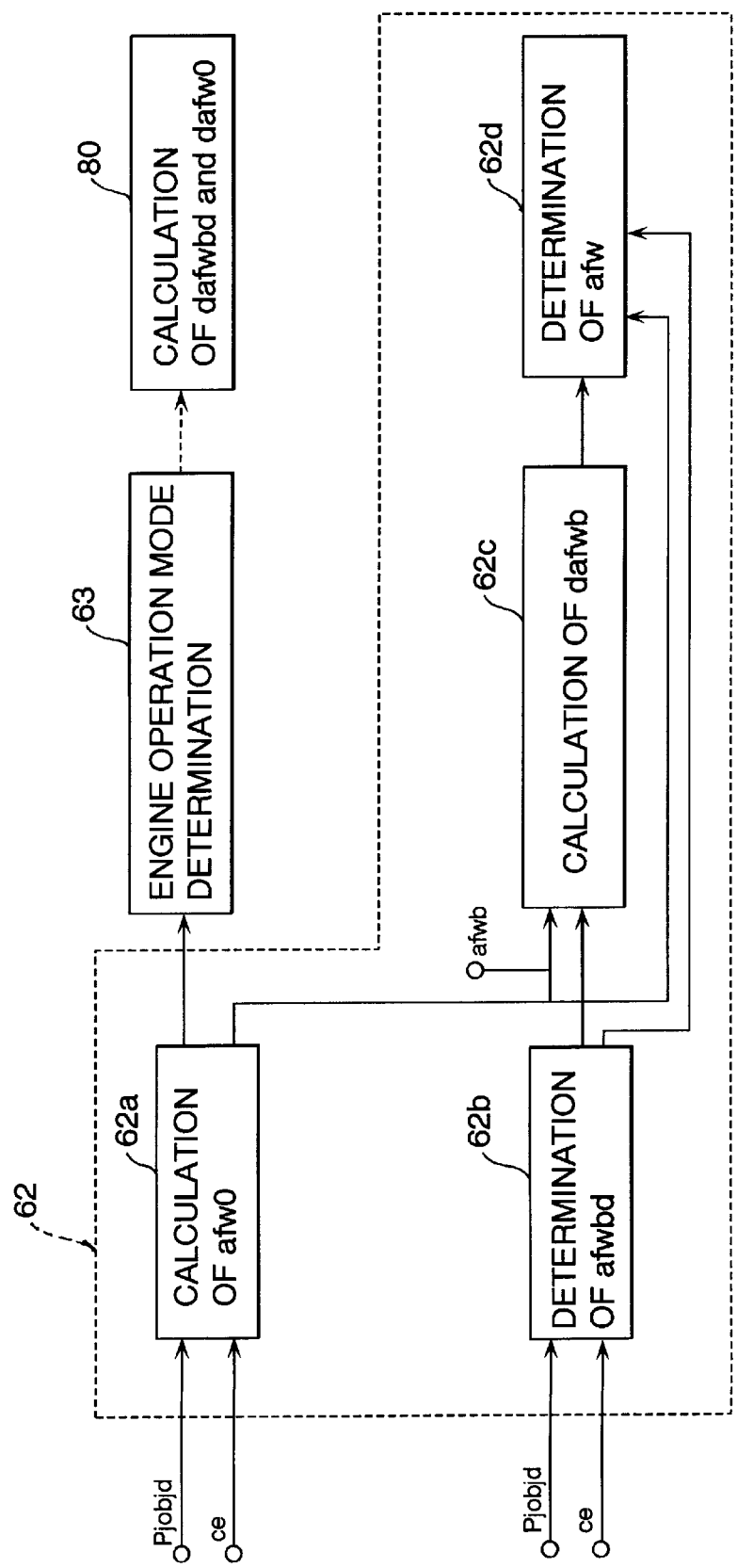
FIG. 5 is a block diagram illustrating the details of target air-fuel ratio determining function.

Fuel injection control is performed through target air-to-fuel ratio determining means 62, combustion mode determining means 63, split ratio determining means 64, an injection amount determining means 65 and an injection timing control means 66 as shown in FIG. 2. The target air-to-fuel ratio determining means 62 determines a target air-to-fuel ratio used for controlling the amount of fuel injection and includes functional means 62a–62d as shown in FIG. 5. The functional means 62a operates to determine a target air-to-fuel ratio afw0 as used mainly in a transitional operating state. The functional means 62b operates to determine a target air-to-fuel ratio afwbd as used mainly in an ordinary operating state. The functional means 62c operates to determine a difference dajwb between the target air-to-fuel ratio afwb as used for the control of intake air determined in the target air-to-fuel ratio determining means 54 and the target air-to-fuel ratio afw0 determined in the target air-to-fuel ratio determining means 62a as used for detection of a transitional operating state. The functional means 62d operates to determine an eventual air-to-fuel ratio afw.

The target air-to-fuel ratio determining means 62a determines the target air-to-fuel ratio afw0 based on a second target indicated mean effective pressure Piobjd or a tempered virtual air charging efficiency ceimgd corresponding to the second target indicated mean effective pressure Piobjd and an actual air charging efficiency ce. The target air-to-fuel ratio afw0 is given by the following expression (5).

$$afw0 = 14.7 \times K1 \times ce / \{(K4 \times (Piobjd - K2)\} - K3$$

or $$afw0 = 14.7 \times ce / K4 \times ceimgd - K3 \quad (5)$$

The expression (5) formulates an air-to-fuel ratio afw0 necessary to gain output torque balancing a target load for actual air charging efficiency ce with a consideration of an effect of improved fuel consumption.

Figure 11A:
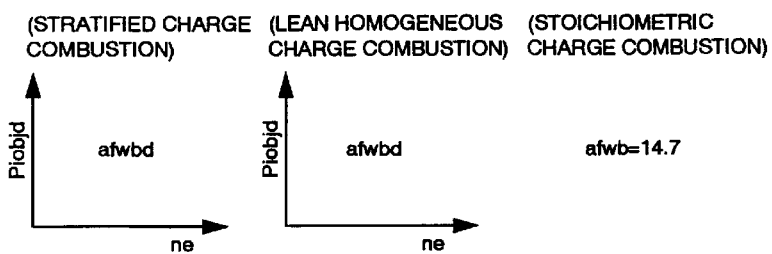
FIGS. 11A, 11B and 11C are schematic illustrations showing target air-fuel ratio control maps, basic EGR valve lift control maps and swirl control opening control maps, respectively, provided for various engine combustion modes.
Figure 11B:
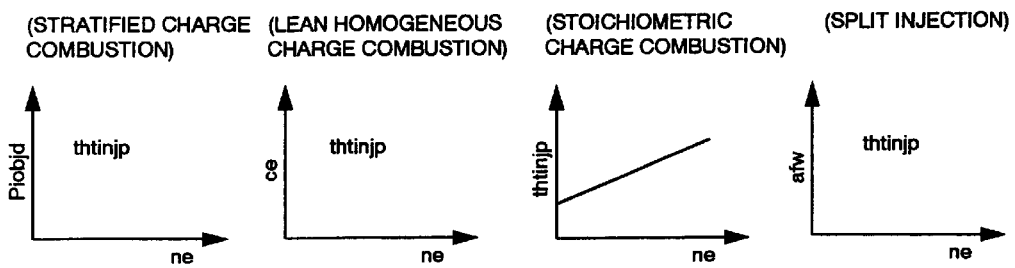
Figure 11C:
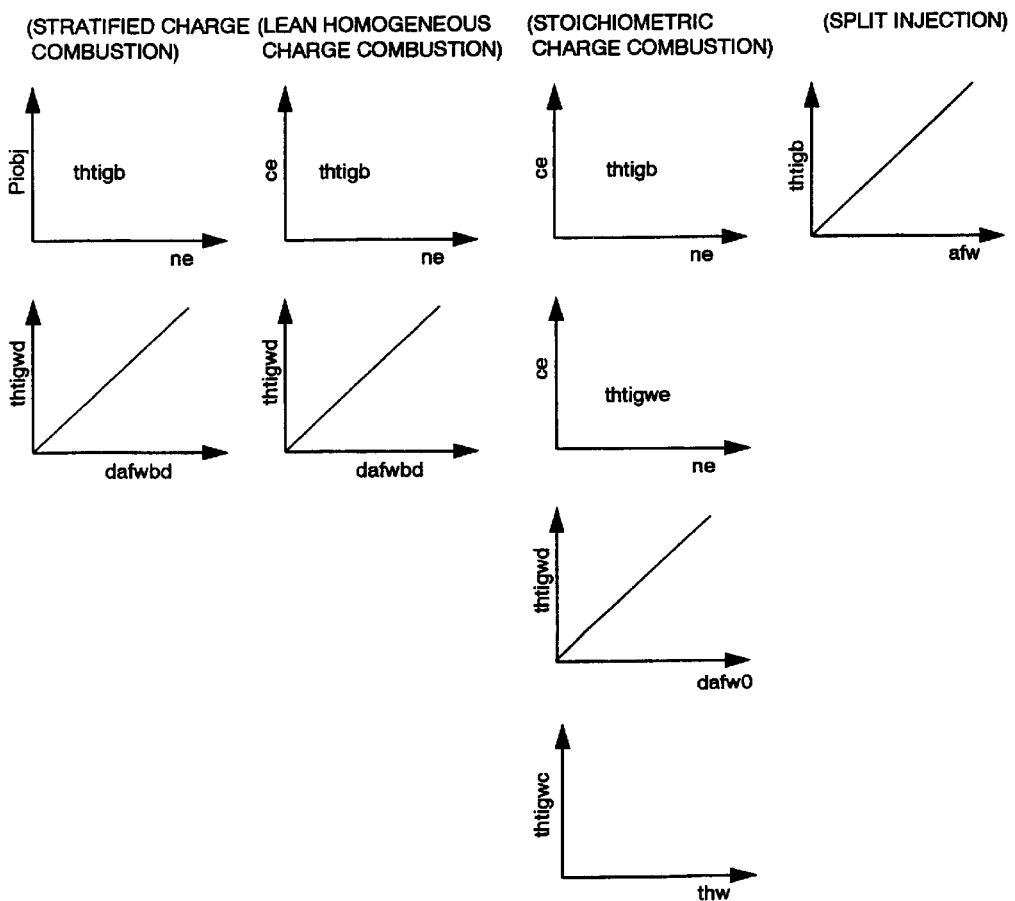

The target air-to-fuel ratio determining means 62b determines a target air-to-fuel ratio afwbd by combustion mode. As shown in FIG. 11A, the target air-to-fuel ratio afwdb is determined according to second target indicated mean effective pressure Piobjd and engine speed ne with reference to a target air-to-fuel ratio control map provided for the stratified charge combustion mode or the lean homogeneous charge combustion mode when the engine operates in the stratified charge combustion mode or the lean homogeneous charge combustion mode, respectively, or is fixed at a stoichiometric air-to-fuel ratio of 14.7 which is represented by an air excess ratio λ of 1 (λ=1) when the engine operates in the stoichiometric charge combustion mode. If necessary, the target air-to-fuel ratio ajwbd may be made lower than the stoichiometric ratio, namely an air excess ratio λ equal to or smaller than 1 (λ≦1), for especially higher engine loads and speeds even in the stoichiometric homogeneous charge combustion mode.

The eventual air-to-fuel ratio determining means 62d determines the target air-to-fuel ratio afw0 determined in the target air-to-fuel ratio determining means 62a as an eventual target air-to-fuel ratio afw during a transitional operating state in which the air-to-fuel ratio difference dafwb is large or the target air-to-fuel ratio afwbd determined in the target air-to-fuel ratio determining means 62b as an eventual target air-to-fuel ratio afw in an ordinary operating state in which the air-to-fuel ratio difference dafwb is small. While the target air-to-fuel ratio determining means 62 is structured as above so as to satisfy a demand for output torque and a lowered emission level, it may be simplified by omitting the target air-to-fuel ratio determining means 62b and the target air-to-fuel ratio difference calculating means 62c therefrom. In this case, the target air-to-fuel ratio afw0 determined in the target air-to-fuel ratio determining means 62a is always taken as the eventual target air-to-fuel ratio afw for controlling the amount of fuel injection.

A functional means 80 shown in FIG. 5 operates to determine a target air-to-fuel ratio difference dafwbd or dafw0 for correcting an ignition timing during a transitional operating staile. Specifically, the target air-to-fuel ratio difference calculating means 80 calculates the target air-to-fuel ratio difference dafwdb by subtracting the eventual target air-to-fuel ratio afw from the target air-to-fuel ratio afwbd in any combustion mode other than the stoichiometric homogeneous charge combustion mode or the target air-to-fuel ratio difference dafw0 by subtracting the eventual target air-to-fuel ratio v from the target air-to-fuel ratio afw in the stoichiometric homogeneous charge combustion mode.

Figure 10:
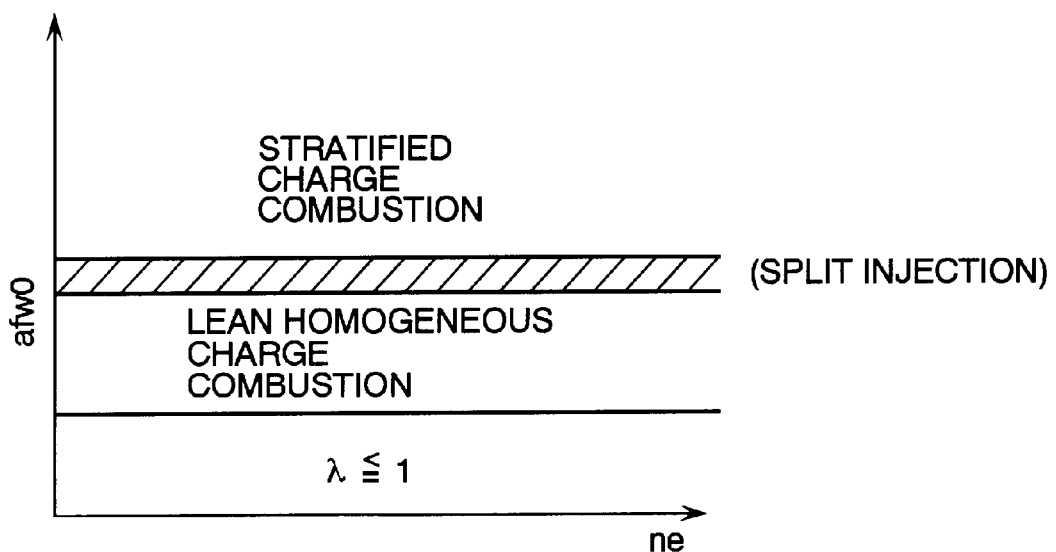
FIG. 10 is a diagram showing engine operating zones for various engine operation modes for fuel injection control.

The combustion mode determining means 63 determines a combustion mode used to determine a reference combustion mode as used to determine the fast response group of control parameters according to the target air-to-fuel ratio afw0 for controlling the amount of fuel injection. As shown in FIG. 10, the stoichiometric homogeneous charge combustion mode is used as the reference combustion mode when the target air-to-fuel ratio afw0 is smaller than a lower limit $L_L$ (which is, for example, approximately 18) for the lean homogeneous charge combustion mode, the lean homogeneous charge combustion mode is used as the reference combustion mode when the target air-to-fuel ratio afw0 is greater than the lower limit $L_L$ but smaller than an upper limit $L_H$ for the lean homogeneous charge combustion mode, or the stratified charge combustion mode is used as the reference combustion mode when the target air-to-fuel ratio afw0 is greater than the upper limit $L_H$. During a transitional operating state in which the target air-to-fuel ratio afw0 changes across the upper limit $L_H$, a narrow band of split injection mode may be provided between the lean homogeneous charge combustion mode and the stratified charge combustion mode as shaded in FIG. 10. In the split injection mode, fuel injection is split into two parts, namely a part of fuel injection made in an intake stroke (an intake stroke split injection) and a part of fuel injection made in a compression stroke (compression stroke split injection). When performing the split injection during a shift from the lean homogeneous stratified charge combustion mode in which intake stroke injection is made to the stratified charge combustion mode in which compression stroke injection is made or vice versa, an abrupt change in combustion condition is prevented.

The split ratio determining means 64 determines a split ratio with which the given amount of fuel injection is split into two parts for intake stroke split injection and compression stroke split injection, respectively, according to combustion modes determined in the engine combustion mode determining means 63. The split ratio for the intake stroke split injection rqbasep is fixedly set to 0 (zero) % in the stratified charge combustion mode and 100% in the lean homogeneous charge combustion mode or the stoichiometric homogeneous charge combustion mode. In the split injection mode, the split ratio is determined according to eventual target air-to-fuel ratio afw and engine speed ne.

Basic amount of fuel injection is calculated based on the eventual target air-to-fuel ratio afw determined in the target air-to-fuel ratio determining means 62 and the split injection ratio rqbasep determined in split ratio determining means 64. Specifically, basic amounts of intake stroke split injection and compression stroke split injection qbasep and qbased are given by the following expressions (6) and (7), respectively.

$$qbasep = KGKF \times (ce(i)afw(i)) \times rqbasep(i) \quad (6)$$

$$qbased = KGKF \times ce(i)afw(i-1) - qbasep(i-1) \quad (7)$$

where the actual air charging efficiency ce followed by an affix (i) (a value based on an intake air flow immediately before compression stroke split injection) is the latest value (the value based on an intake air flow immediately before compression stroke split injection) thereof, the actual air charging efficiency ce, the eventual target air-to-fuel ratio afw and the basic amounts of fuel injection qbasep followed by an affix (i−1) are the last values (the values based on respective control parameters immediately before intake stroke split injection) thereof, and KGKF is the conversion factor.

Further, eventual amounts of fuel injection qinjp and qinjd for intake stroke split injection and compression stroke split injection are determined in consideration of correction values including correction values cdpfp and cdpfd for intake and compression split injection according to fuel pressure and a correction value ctotal for other control parameters. The eventual amounts of fuel injection qinjp and qinjd are given by the following expressions (8) and (9), respectively.

$$qinjp = qbasep \times cdpfp \times (1 + ctotal(i)) \quad (8)$$

$$qinjd = qbased \times cdpfd \times \{1 + ctotal(i-1)\} \quad (9)$$

where the correction value ctotal followed by an affix (i−1) is the last value thereof (the value immediately before the intake stroke split injection).

Finally, an injection pulse width Ti which is proportional to the eventual amount of fuel injection qinjp, qinjd is determined.

The reason for the utilization of the last value of eventual target air-to-fuel ratio afw(i−1) in the calculation of the basic amount of fuel injection qbased, and hence the eventual amount of fuel injection qinjd, for compression stroke split injection is that if the latest value of eventual target air-to-fuel ratio afw(i) (the value immediately before compression stroke split injection) is employed, the combustion mode and air-to-fuel ratio possibly fluctuate between intake and compression stroke split injection, which leads to loss of coordination.

The injection timing control means 66 determines a fuel injection timing by combustion mode. As shown in FIG. 12B, in the stratified charge combustion mode, a fuel injection timing thtinjd for compression stroke injection is obtained from a fuel injection timing control map defined with second target indicated mean effective pressure Piobjd and engine speed ne provided for the stratified charge combustion mode. Similarly, in the lean homogeneous charge combustion mode, a fuel injection timing thtinjp for intake stroke injection is obtained from a fuel injection timing control map defined with actual air charging efficiency ce and engine speed ne provided for the homogeneous lean combustion mode. Further, in the stoichiometric homogeneous charge combustion mode, a fuel injection timing thtinjp for intake stroke injection is obtained according to actual air charging efficiency ce from a table. In this instance, as au expedient for calculation, some values are always assigned for these fuel injection timings thtinjd. For example, in the stratified charge combustion mode, while a value on the fuel injection timing control map is assigned for the fuel injection timing thtinjd for compression stroke injection, a fixed value is assigned for the fuel injection timing thtinjp for intake stroke injection. However, since the split ratio for the intake stroke split injection rqbasep is fixed to 0% in the stratified charge combustion mode, the intake stroke injection is not in any way executed. In the lean homogeneous charge combustion mode or the stoichiometric homogeneous charge combustion mode, while a value on the fuel injection timing control map or the fuel injection timing control table is assigned for the fuel injection timing thtinjp for intake stroke injection, a fixed value such as a specific early time in a compression stroke is assigned for the fuel injection timing thtinjd for compression stroke injection for making an additional injection to supply a deficiency in the intake stroke. Further, in the split injection mode, while the utilization is made of the fuel injection timing thtinjd for compression stroke injection in the stratified charge combustion mode, a value on the fuel injection timing control map defined with eventual target air-to-fuel ratio afw and engine speed ne is assigned for the fuel injection timing thtinjp for intake stroke injection.

Fuel injection control means 67 performs pulsing the fuel injector 22, or energizing a solenoid causing the fuel injector, to open for a time corresponding to the injection pulse width Ti determined in the injection pulse width determining means 65d.

Ignition timing is controlled through functional means 68 for determining a basic ignition timing and ignition timing correction values and functional means 69 for determining an eventual ignition timing based on the basic ignition timing and ignition timing correction values. The basic ignition timing determining means 68 determines a basic ignition timing thtigb and various correction values necessary to determine an eventual ignition timing. Specifically, as shown in FIG. 12C, in the stratified charge combustion mode, a basic ignition timing thtigb is obtained from a basic injection timing control map defined with second target indicated mean effective pressure Piobjd and engine speed ne provided for the stratified charge combustion mode, and an A/F related correction value thtigwd is obtained from a correction value control table defined with target air-to-fuel ratio difference dabd of the target air-to-fuel ratio afwvbd from the eventual target air-to-fuel ratio afw. While the basic ignition timing thtigb is determined according to a second target indicated mean effective pressure Piobjd and an engine speed ne at a target air-to-fuel ratio afwbd in an ordinary operating state, the A/F related, correction value thtigwd, whereas, since, in the transitional operating state, the target air-to-fuel ratio afw0 is taken as the eventual target air-to-fuel ratio afw and in consequence there is brought about a difference of air-to-fuel ratio, this correction according to the target air-to-fuel ratio difference dafwbd (=afwbd−afw) is used to adjust the ignition timing so as to balance the air-to-fuel ratio difference. Similarly, in the lean homogeneous charge combustion mode, a basic ignition timing thtigb is obtained from a basic injection timing control map defined with actual air charging efficiency ce and engine speed ne provided for the lean homogeneous charge combustion mode, and an A/F related correction value thtigwd is obtained from a correction value control table defined with target air-to-fuel ratio difference dafwbd. Further, in the stoichiometric charge combustion mode, a basic ignition timing thtigb is obtained from a basic injection timing control map defined with actual air charging efficiency ce and engine speed ne provided for the stoichiometric homogeneous charge combustion mode. Correction values for the basic ignition timing thtigb, namely an EGR related correction value thtigwe used during execution of exhaust gas recirculation, an A/F related correction value thtigwd according to a target air-to-fuel ratio difference dafw0 and a temperature related correction value thtigwc used during cold engine operation according to engine coolant temperature thw. The EGR related correction value thtigwe is obtained from a correction value control map defined with actual air charging efficiency ce and engine speed ne. The A/F related correction value thtigwd is obtained from a correction value control table defined with target air-to-fuel ratio difference dafwb0. The temperature related correction value thtigwc is obtained from a correction value control table defined with engine coolant temperature thw. This correction according to the target air-to-fuel ratio difference dafwbd (=afwbd−afw) is executed to adjust the ignition timing so as to balance a torque change in the event the eventual target air-to-fuel ratio afw is made stoichiometric in order to avoid that the target air-to-fuel ratio afw0 changes to a specified one on the lean side lower than the stoichiometric air-to-fuel ratio via one which provides an increased amount of NOx emission as will be described later. In the split injection mode, a basic ignition timing thtigb is obtained from a basic injection timing control table defined with eventual target air-to-fuel ratio afw.

An eventual ignition timing is determined based on these basic ignition timing and various correction values and is given by the following expression (10).

$$\text{thtig}=\text{thtigb}-(thtigwd+thtigwe+thtigwc) \tag{10}$$

The engine control unit (PCM) 50 further includes functional means for mode shift control, namely mode shift determining means 70, control value judging means 71 and mode shift restraint means 72. Specifically, the shift demand judging means 70 judges whether engine operating condition demands a shift of combustion mode, i e whether the present combustion mode must be changed to a combustion mode determined according to a target air-to fuel ratio in the combustion mode determining means 63. When it is judged that a change to the combustion mode determined in the combustion mode determining means 63 must be caused, the control value judging means 71 judges whether the swirl valve 32 or the EGR valve 38 is within a permissible extend of control in the demanded combustion mode. The judgement is performed by comparing the difference between the current control value and a target control value in the demanded combustion mode of the swirl valve 32 or the EGR valve 38 with a permissible value. When the current control value is out of the permissible extent, that is, when the difference of control value exceeds the permissible value, the mode shift restraint means 72 restrains a mode shift to the demanded combustion mode until the control value of swirl valve 32 or EGR valve 38 reaches within the permissible extent of control value in the demanded combustion mode.

Figure 12:
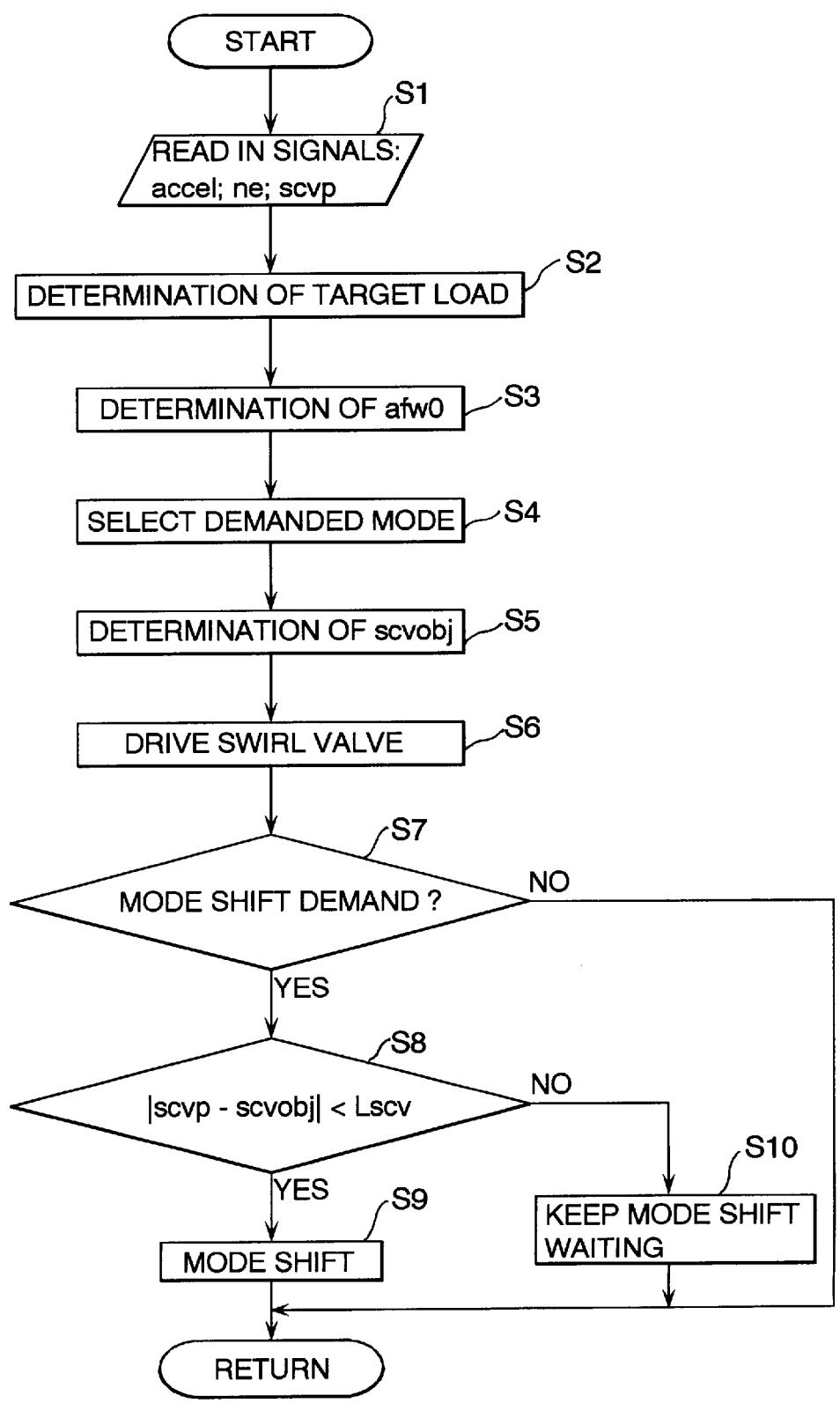
FIG. 12 is a flow chart illustrating a sequence routine of swirl valve control during a shift between combustion modes.

FIG. 12 shows a flow chart illustrating a sequence routine of mode shift control executed in these mode shift determining means 70, control value judging means 71 and mode shift restraint means 72. When the flow chart logic commences and control proceeds to a function block ar step S1 where signals representative of accelerator pedal travel accel, engine speed ne, and swirl control valve opening scvp are read in. Subsequently, a target load and a target air-to-fuel ratio are determined at step S2 and S3, respectively. One of the combustion modes shown in FIG. 10 is selected as a demanded combustion mode according to the target air-to-fuel ratio at step S4. A target valve opening scvobj in the demanded combustion mode of the swirl control valve 32 is determined at step S5, and then the swirl control valve 32 is driven so as to attain the target valve opening scvobj at step S6.

At step S7, a judgement is made as to whether there is a mode shift demand. This judgement is made by monitoring whether the target air-to-fuel ratio afw0 has changed to a value which needs a mode shift to another combustion mode from the combustion mode determined at step S4. When there is no mode shift demand, the flow chart logic orders return for another execution of the sequence routine. When there is a mode shift demand, a judgement is subsequently made at step S8 as to whether a threshold value or specified permissible value Lscv is exceeded by the absolute value of a difference of the present valve opening scvp of the swirl control valve 32 from the target valve opening scvobj (which is hereafter referred to as a swirl control valve opening difference). When the swirl control valve opening difference is still lies than the threshold value Lscv, then the demanded mode shift is executed at step S9. On the other hand, when the swirl control valve opening difference has exceeded the threshold value Lscv, then the mode shift is kept waiting at step S10.

Figure 13:
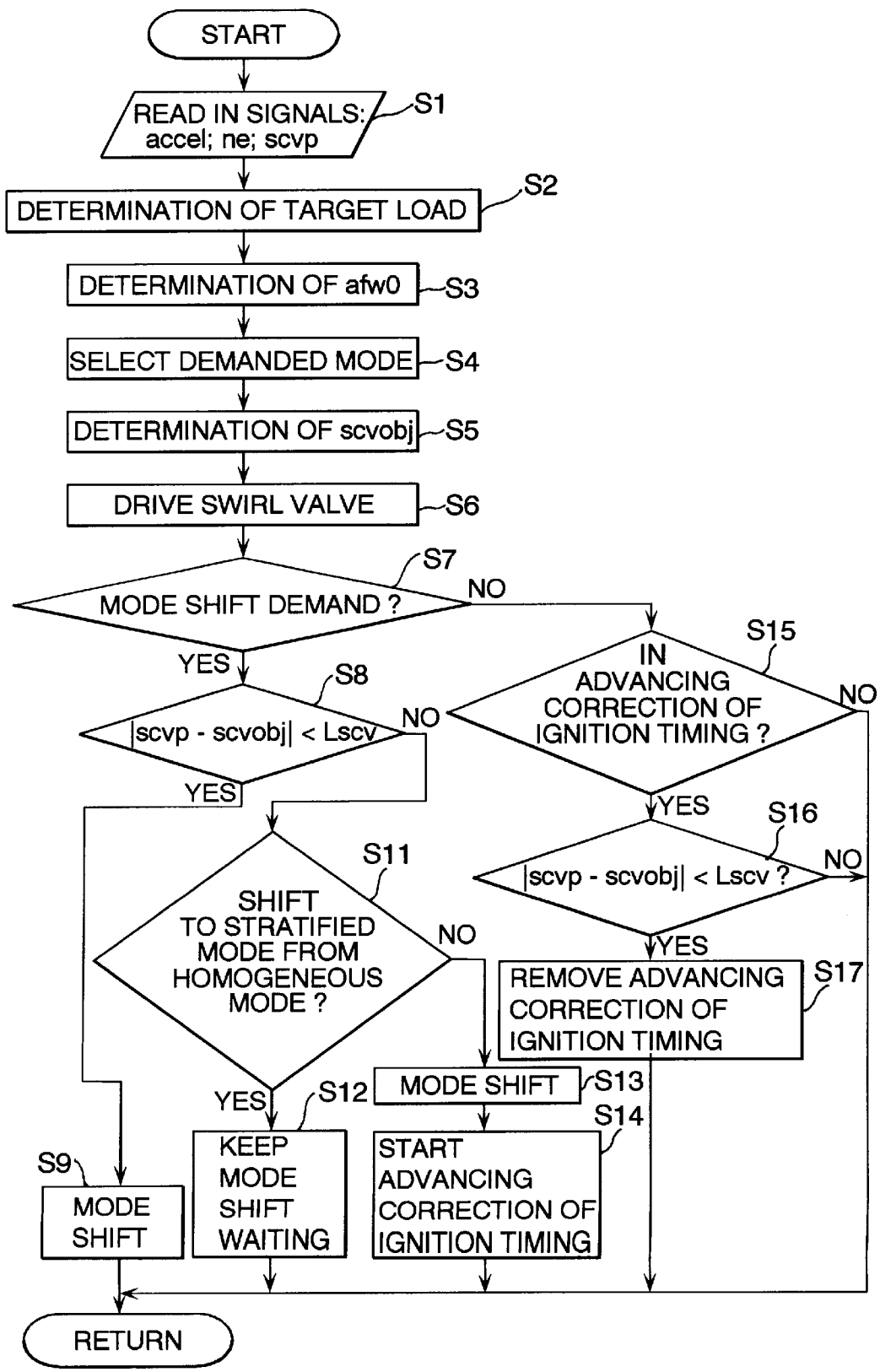
FIG. 13 is a flow chart illustrating another sequence routine of swirl valve control during a shift between combustion modes.

FIG. 13 shows a flow chart illustrating a variation of the sequence routine of mode shift control, which includes additional steps S11 through S17 taking place when the swirl control valve opening difference has exceeded the threshold value Lscv. Specifically, when it is judged at step S8 that the swirl control valve opening difference has exceeded the threshold value Lscv, a judgement is made at step S11 as to whether another mode shift, namely, from the stratified charge combustion mode to the homogeneous (lean homogeneous or stoichiometric) charge combustion mode. When the answer is affirmative, a mode shift is kept waiting at step S12, and then the flow chart logic orders return for another execution of the sequence routine. On the other hand, when the answer is negative, the demanded mode shift is executed at step S13. Subsequently, an ignition timing advance correction is started at step S14, and then the flow chart logic orders return for another execution of the sequence routine.

When there is no mode shift demand at step S7, a judgement is made at step S15 as to whether an ignition timing advance correction started at step S14 is still under execution. When under execution, then another judgement is made at step S16 as to whether the threshold value or specified permissible value Lscv is exceeded by the absolute value of a difference of the present valve opening scvp of the swirl control valve 32 from the target valve opening scvobj. When the threshold value or specified permissible value Lscv is not yet exceeded by the absolute difference of swirl control valve opening, the ignition timing advance correction is terminated at step S17, and then the flow chart logic orders return for another execution of the sequence routine. On the other hand, the threshold value or specified permissible value Lscv has been exceeded by the swirl control valve opening difference or when the ignition timing advance correction has been over, the flow chart logic orders return for another execution of tie sequence routine.

According to the direct injection-spark ignition type of engine equipped with the engine control system of the embodiment, the engine operates in the three different combustion modes, i.e. the stratified charge combustion mode, the lean homogeneous charge combustion mode and the stoichiometric charge combustion mode, according to engine operating conditions. In the stratified charge combustion mode, the engine performs stratified charge combustion with a lean fuel mixture having an air-to-fuel ratio is significantly greater than the stoichiometric air-to-fuel ratio, so as to provide a remarkably improved fuel consumption. In the lean homogeneous charge combustion mode, the engine is supplied with a relatively lean fuel mixture having an air-to-fuel ratio is greater to a certain extent than the stoichiometric air-to-fuel ratio in an intake stroke and performs homogeneous charge combustion. Further, in the stoichiometric charge combustion mode, the engine performs stoichiometric charge combustion with a stoichiometric fuel mixture. In the stratified charge combustion mode and in the lean homogeneous charge combustion mode, the amount of intake air is controlled based on the combustion mode and a target engine load in such a way that the throttle valve 28 is increasingly opened to increase the intake air flow rate so as thereby to vary the fuel mixture lean together with satisfactorily providing demanded torque. Simultaneously, control of the amount of fuel injection, an injection timing and an ignition timing are made together with control of the swirl control valve 32 and the EGR valve 38 are controlled. These control parameters are aptly regulated in consideration with their control responsiveness. Throttle opening is determined based on a target volumetric efficiency veobj which is obtained by determining a target air charging efficiency ceobj based on a target air-to-fuel ratio for intake air control and tempering the target air charging efficiency ceobj with an intake air density, so that the control of throttle opening is accurate. Performing the determination of combustion mode and the control of the control parameters, i.e. the amount of fuel injection, an injection timing and an ignition timing, based on a target air-to-fuel ratio for fuel injection control which is obtained a target engine load and an actual air charging efficiency provides proper combustion mode selection and air-to-fuel ratio regulation even during a transition of operating condition in which the air charging efficiency greatly changes.

The slow response control parameter such as the amount of intake air is controlled based on a first indicated mean effective pressure Piobj, and the fast response control parameter such as the amount of fuel injection is controlled based on a second indicated mean effective pressure Piobjd which is obtained based on a tempered virtual air charging efficiency ceimgd. This provides proper timing at which the control parameters operate. Specifically, in a general engine which changes throttle opening according to accelerator pedal travels during a normal operating state in which the engine operates with a stoichiometric air-to-fuel ratio over the most part of available operation zone, the amount of intake air changes with a delay even when an accelerator pedal travel, and hence throttle opening, quickly changes during acceleration, and output torque mostly changes responsively to a change in the amount of intake air, in the case of controlling the output torque to change imitatively the change in the amount of intake air, a second indicated mean effective pressure Piobjd obtained based on a tempering virtual air charging efficiency ceimgd is applied to an actual demanded engine load. Therefore, the output torque is provided with a characteristic during a transitional operating state similar to during an ordinary operating state by controlling the fast response control parameter according to the second indicated mean effective pressure Piobjd, which is always desirable for eliminating a sharp change in output torque and assuring a favorable driving feeling. Each of the slow response control parameters, i.e. opening of the throttle valve 28, swirl control valve and EGR valve, has a certain delay response to a change in target engine load. In consequence, the amount of intake air, the amount of exhaust gas recirculation and a swirl ratio change with a delay following a change in target engine load. In other words, the amount of intake air tends to change slowly relative to a change in virtual air charging efficiency. The delay in response can be reduced by controlling the amount of intake air with a first indicated mean effective pressure Piobj obtained based on a not-tempered virtual air charging efficiency ceimg.

While a time lag between control timings for these fast and slow response parameters is reduced in the way as described above, nevertheless, it is difficult to make the control timings completely coincident with each other. Turning attention to the swirl control valve 32, the engine possibly encounters aggravation of combustibility when the swirl control valve 32 operates with a response delay during a mode shift. Contrarily to this, performing the mode shift control shown in FIGS. 12 or 13 prevents or significantly reduces aggravation of combustibility due to a response delay of the swirl control valve 32 relative to a mode shift.

Figure 14:
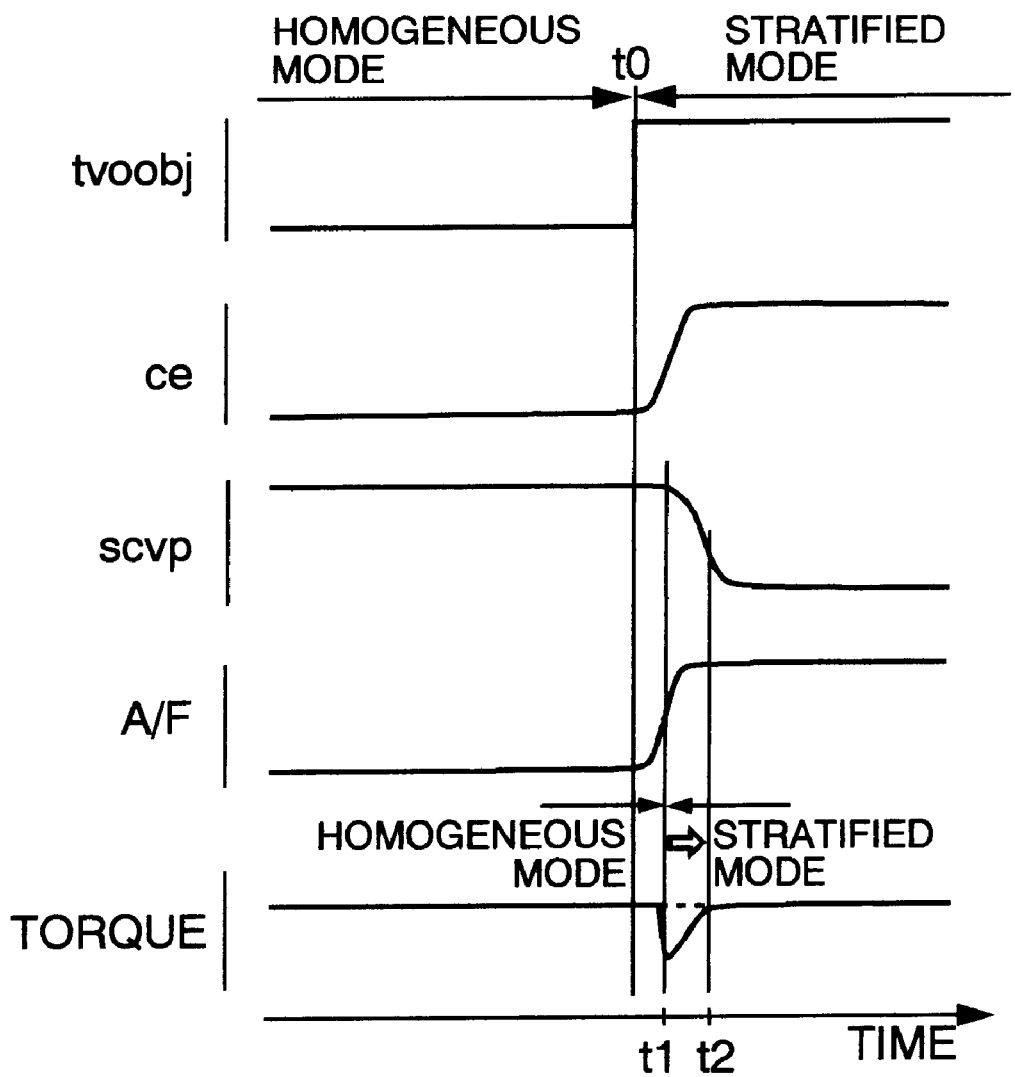
FIG. 14 is a time table of changes in throttle opening, air charging efficiency, swirl control valve, air-fuel ratio and output torque during a shift from a homogeneous charge combustion mode to a stratified charge combustion mode.
Figure 15:
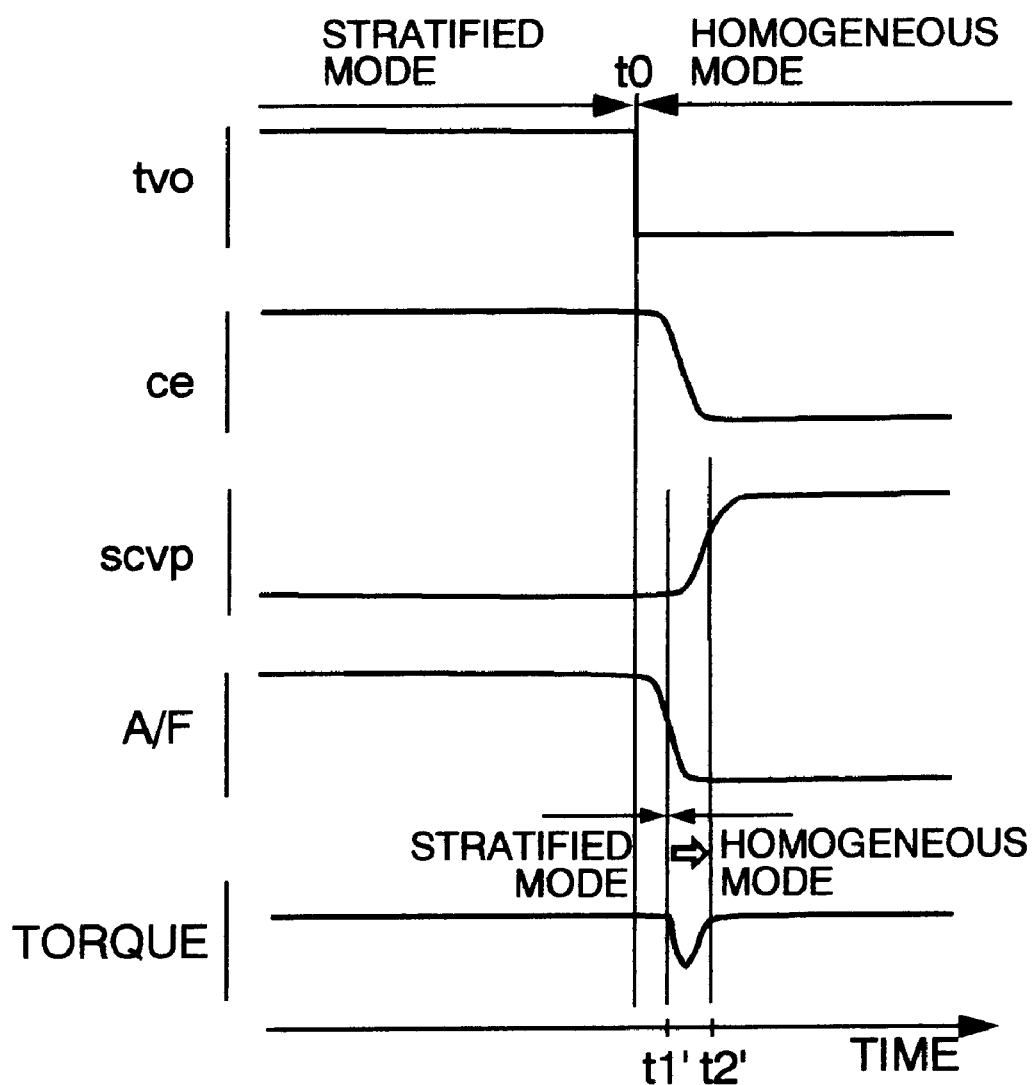
FIG. 15 is a time table of changes in throttle opening, air charging efficiency, swirl control valve, air-fuel ratio and output torque during a shift from a stratified charge combustion mode to a homogeneous charge combustion mode.

FIGS. 14 and 15 show time tables of changes in control parameters during a mode shift to the stratified charge combustion mode from the homogeneous charge combustion mode and a mode shift to the homogeneous charge combustion mode from the stratified charge combustion mode, respectively.

FIG. 14 shows changes in target throttle opening tvoobj, air charging efficiency ce, swirl control valve opening scvp, air-fuel ratio and output torque with respect to time during a mode shift to the stratified charge combustion mode from the homogeneous charge combustion mode. As well known in the art, the smaller the opening of the swirl control valve 32 is, the stronger the swirl becomes. In the stratified charge combustion mode in which a fuel mixture is significantly lean, a target opening scvobj of the swirl control valve 32 is determined to be greater to enhanced a swirl so as thereby to increase combustibility. On the other hand, in the homogeneous charge combustion mode, a target opening scvobj of the swirl control valve 32 is determined to be smaller as compared with that in the stratified charge combustion mode so as to avoid occurrence of knocking due to too early combustion. As shown, the target opening tvoobj of throttle valve 28 is controlled to increase at a point of time t0 at which basic operation mode is changed in the basic combustion mode determining means 53. Following the change in throttle valve opening tvoobj, an air charging efficiency ce increasingly changes with a certain response delay, which is accompanied by an increase in air-to-fuel ratio. Further, the swirl control valve opening scvp is reduced with a certain delay relative to the change in throttle valve opening tvoobj. Generally, at a point of time t1 at which the air-to-fuel increases to a certain extent, a mode shift demand occurs. At this time, since the swirl control valve 32 is delayed in operation and remains open still greatly, if a mode shift to the stratified charge combustion mode is actually made, the engine encounters aggravation of combustibility due to an insufficient swirl with an adverse effect of causing a temporary drop in output torque as shown by a solid line in FIG. 14. Contrarily to this, according to the mode shift control shown in FIGS. 12 or 13, while the swirl control valve opening difference (scvp–scvobj) remains greater than threshold value Lscv, it is waited to execute the mode shift. In other words, the injection timing and the ignition timing are kept in a state before execution of the mode shift to maintain homogeneous charge combustion through intake stroke injection, preventing aggravation of combustibility. At a point of time t2 at which the swirl control valve 32 reduces its opening scvobj as small as it provides a swirl required for stratified charge combustion, the injection timing and the ignition timing are changed to cause an actual mode shift to the stratified charge combustion mode. In consequence, the output torque remains stable during execution of a mode shift as shown by a broken line in FIG. 14.

FIG. 15 shows changes in target throttle opening tvoobj, air charging efficiency ce, swirl control valve opening scvp, air-fuel ratio and output torque with respect to time during a mode shift to the homogeneous charge combustion mode from the stratified charge combustion mode. As shown, the target opening tvoobj of throttle valve 28 is controlled to decrease at the point of time t0 at which basic operation mode is changed in the basic combustion mode determining means 53. Following the change in throttle valve opening tvoobj, an air charging efficiency ce decreasingly changes with a certain response delay, which is accompanied by a decrease in air-to-fuel ratio. Further, the swirl control valve opening scvp is increased with a certain delay relative to the change in throttle valve opening tvoobj. At a point of time t1' at which the air-to-fuel increases to a certain extent, a mode shift demand occurs. Since the swirl control valve 32 is delayed in operation and remains open relatively small, if a mode shift to the stratified charge combustion mode is actually made, the engine encounters an over advance of ignition timing or knocking due to a too strong swirl with an adverse effect of causing a temporary drop in output torque as shown by a solid line in FIG. 15. Contrarily to this, by means of the mode shift control shown in FIG. 12, the mode shift is waited till a point of time t2' before which the swirl control valve 32 changes its opening scvp as small as the swirl control valve opening difference (scvp–scvobj) lowers below than threshold value Lscv, so as thereby to prevent a drop in output torque. Further, by means of the mode shift control shown in FIG. 13, while the mode shift to the homogeneous charge combustion mode from the stratified charge combustion mode is caused at the point of time t1', the ignition timing is retarded, preventing knocking due to an over ignition timing advance. In place of restraining a mode shift or regulating an ignition timing according to a delay in operation of the swirl control valve 32 during a mode shift, it may be done to judge whether an EGR valve lift is within a permissible, extent for a demanded combustion mode by the control value judging means 71 and restrain a mode shift by the mode shift restraint means 72 when the EGR valve lift is out of the permissible extent.

Figure 16:
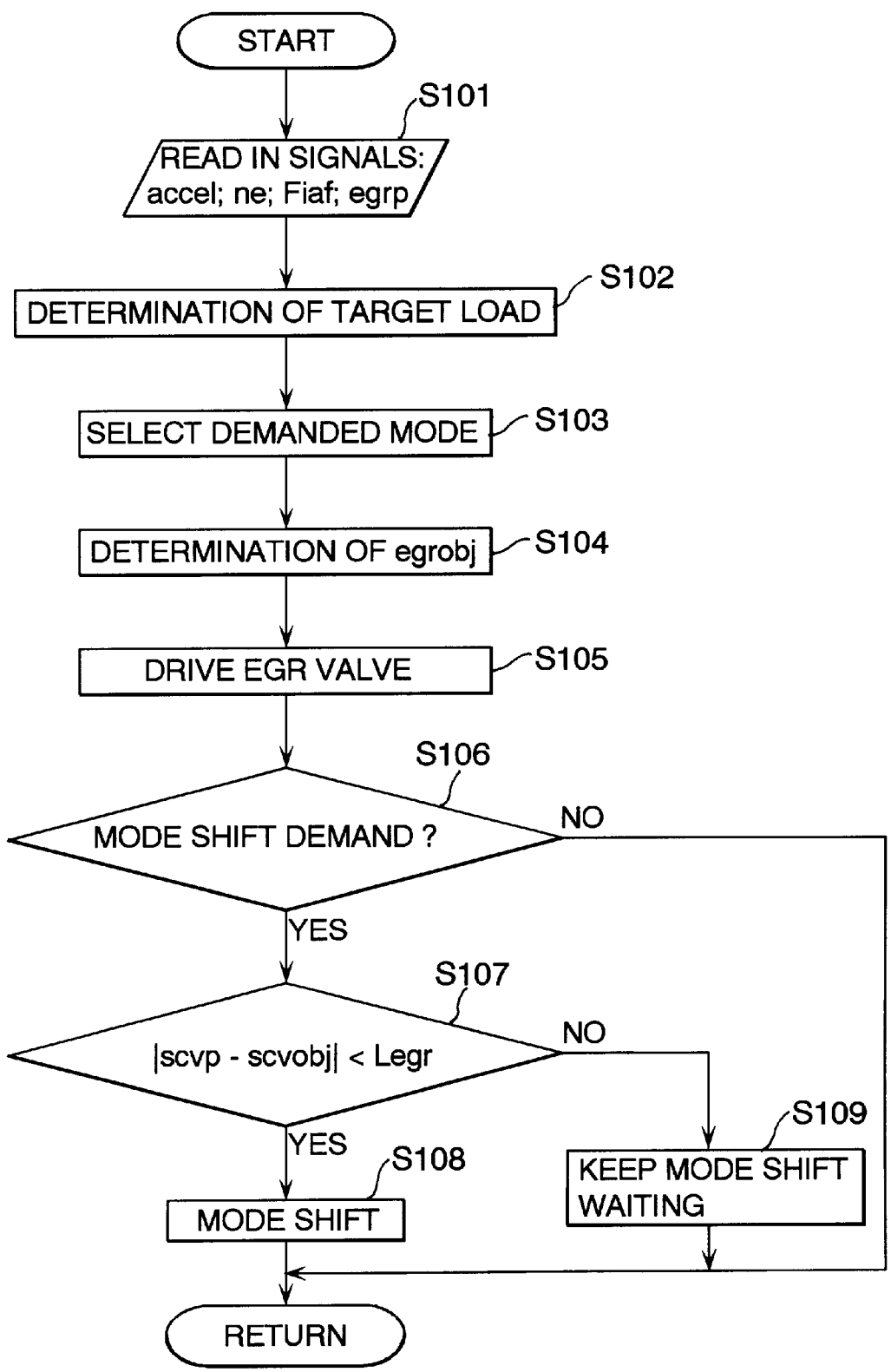
FIG. 16 is a flow chart illustrating a sequence routine of EGR valve control during a shift between combustion modes.

FIG. 16 is a flow chart illustrating a sequence routine of mode shift control in which a response delay of the EGR valve 38 is dealt with. When the flow chart logic commences and control proceeds to a function block ar step S101 where signals representative of accelerator pedal travel accel, engine speed ne, intake air flow rate Fiaf and EGR valve lift egrp are read in. Subsequently, a target engine load is determined at step S102, and then, one of the combustion modes is selected as a demanded combustion mode at step S103. A target valve lift egrobj is determined according to the demanded combustion mode and the target engine load at step S104. At step S105, the EGR valve 38 is driven so as to attain the target valve lift egrobj.

Thereafter, at step S106, a judgement is made as to whether there is a mode shift demand. When there is no mode shift demand, the flow chart logic orders return for another execution of the sequence routine. On the other hand, when there is a mode shift demand, a judgement is subsequently made at step S107 as to whether a threshold value or specified permissible value Legr is exceeded by the absolute value of a difference of the present valve lift egrp of the EGR valve 38 from the target valve lift egrobj (which is hereafter referred to as a EGR valve lift difference). When the EGR valve lift difference is still less than the threshold value Legr, then the demanded mode shift is executed at step S108. On the other hand, when the EGR valve lift difference has exceeded the threshold value Legr, then the mode shift is kept waiting at step S109.

Figure 17:
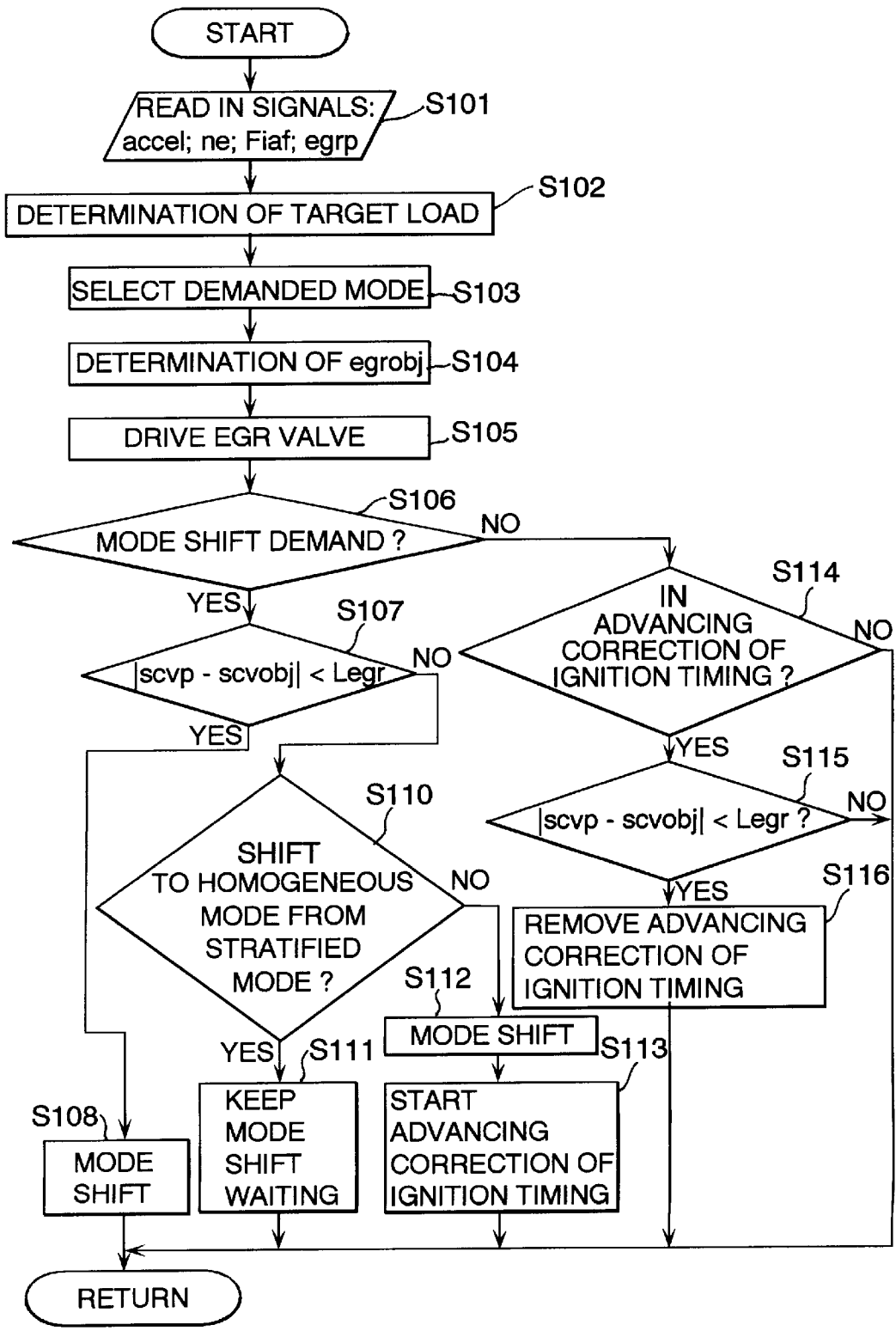
FIG. 17 is a flow chart illustrating another sequence routine of EGR valve control during a shift between combustion modes.

FIG. 17 shows a flow chart illustrating a variation of the sequence routine of mode shift control, which includes additional steps S108 through S116 taking place when the EGR valve lift difference has exceeded the threshold value Legr. Specifically, when it is judged at step S107 that the EGR valve lift difference has exceeded the threshold value Legr, a judgement is made at step S110 as to whether another mode shift, namely to the homogeneous charge combustion mode from the stratified charge combustion mode, is demanded. When the answer is affirmativie, a mode shift is kept waiting at step S111. On the other hand, when the answer is negative, after executing the demanded mode shift at step S112, an ignition timing advance correction is started at step S113. When there is no mode shift demand at step S106, a judgement is made at step S114 as to whether an ignition timing advance correction started at step S113 is still under execution. When under execution, then another judgement is made at step S115 as to whether the threshold value Legr is exceeded by an EGR valve lift difference. When the threshold value Legr is not yet exceeded by the EGR valve lift difference, the ignition timing advance correction is terminated at step S116. On the other hand, when the ignition timing advance correction has been over at step S114 or when the threshold value Legr has been exceeded by the EGR valve lift difference at step S115, the flow chart logic orders return for another execution of the sequence routine.

The mode shift control shown in FIGS. 16 or 17 prevents aggravation of combustibility and output torque fluctuations due to a delay in response of the EGR valve 38 during a mode shift. That is, in the stratified charge combustion mode in which a fuel mixture is distributed or stratified unevenly thick at a proper air-to-fuel ratio around the spark plug 20, since the combustibility is apt to be easily stabilized even during execution of exhaust gas recirculation, the EGR valve 38 can be controlled to admit a relatively large amount of exhaust gas into an intake air flow. In the lean homogeneous combustion mode in which a lean fuel mixture is uniformly distributed over the entire combustion chamber, since the combustibility is easily spoilt when exhaust gas is admitted, the EGR valve 30 is closed. If a mode shift is made from the stratified charge combustion mode to the lean homogeneous charge combustion mode at a point of time till which the amount of exhaust gas recirculation has not yet been sufficiently reduced due to a delay in response of the EGR valve 38, there occurs misfiring due to aggravation of the combustibility, resulting in a output torque drop.

Contrarily to this, according to the mode shift control shown in FIGS. 16 or 17, execution of a shift mode is kept waiting until the EGR valve 38 changes its valve lift as small as it provides a sufficient reduction in the amount of exhaust gas recirculation, securely preventing misfiring. During a mode shift to the stratified charge combustion mode from the lean homogeneous charge combustion, while there occurs no misfiring even when the amount of exhaust gas recirculation becomes lower than a target amount for the stratified charge combustion mode due to a delay in response of the EGR valve 38, however, the output torque somewhat fluctuates. Therefore, it is desirable to correct the ignition timing to remove the fluctuations of output torque as shown in FIG. 17.

Figure 18:
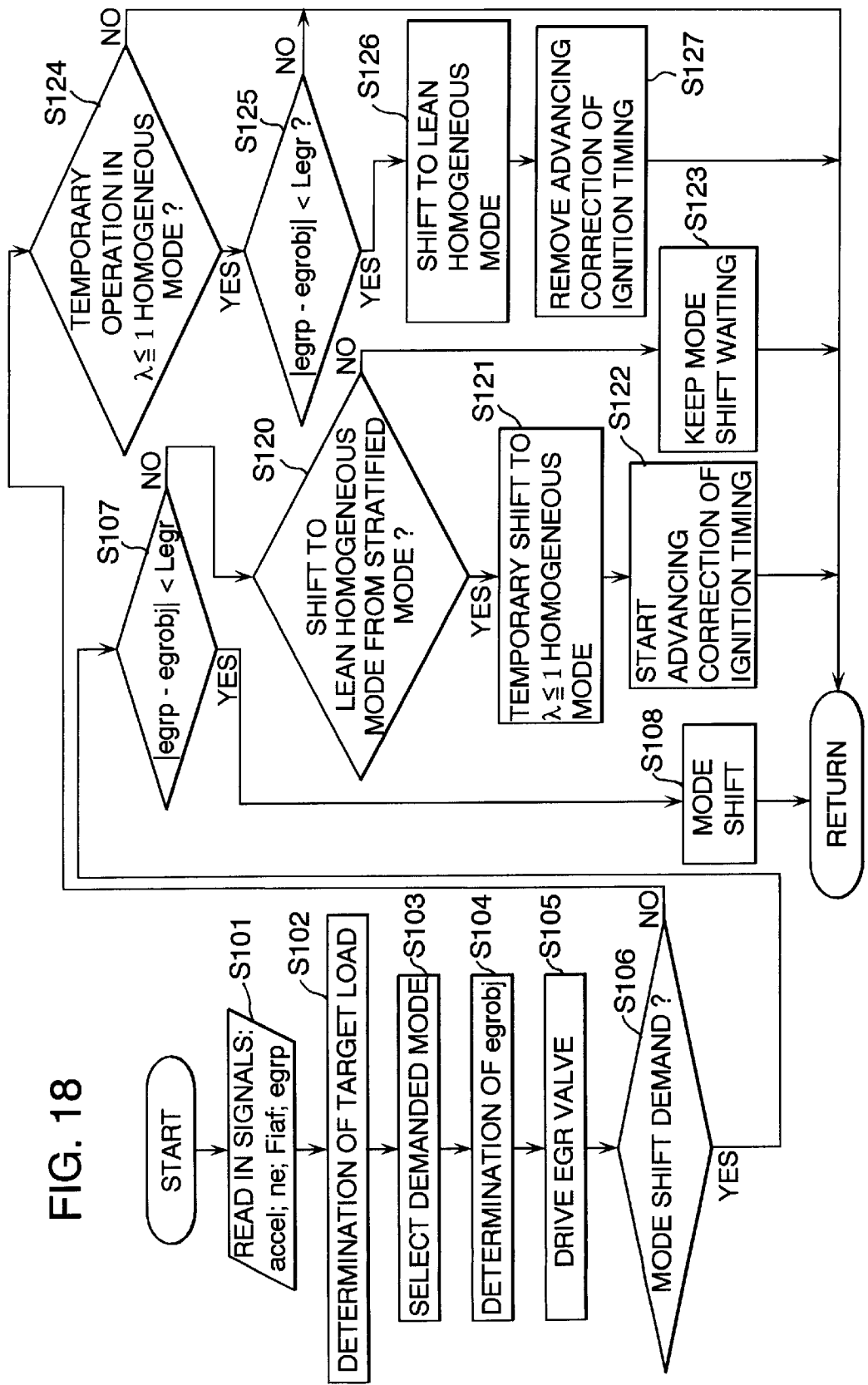
FIG. 18 is a flow chart illustrating still another sequence routine of EGR valve control during a shift between combustion modes.

FIG. 18 shows a flow chart illustrating another variation of the sequence routine of mode shift control which includes additional steps S121 through S126 taking place when the EGR valve lift difference has exceeded the threshold value Legr. Specifically, when it is judged at step S107 that the EGR valve lift difference has exceeded the threshold value Legr, a judgement is made at step S110 as to whether another mode shift, namely to the homogeneous charge combustion mode from the stratified charge combustion mode, is demanded. When the answer is affirmative, a mode shift is temporarily made to a $\Delta \leqq 1$ homogeneous charge combustion mode (which is referred to a stoichiometric homogeneous charge combustion mode and a rich homogeneous charge combustion mode) at step S121, and then an ignition timing advance correction is started to regulate output torque at step S122. On the other hand, when the answer is negative, execution of a shift mode is kept waiting at step S113. When there is no mode shift demand at step S106, a judgement is made at step S124 as to whether the engine still operates in the $\Delta \leqq 1$ homogeneous charge combustion mode. When the engine operation remains in the $\Delta \leqq 1$ homogeneous charge combustion mode lasts, then another judgement is made at step S125 as to whether the threshold value Legr is exceeded by an EGR valve lift difference. When the threshold value Legr is not yet exceeded by the EGR valve lift difference, after making a mode shift to the lean homogeneous charge combustion mode at step S126, the ignition timing advance correction is terminated at step S127. On the other hand, when the engine operation is out of the $\Delta \leqq 1$ homogeneous charge combustion mode at step S124 or when the threshold value Legr has been exceeded by the EGR valve lift difference at step S125, the flow chart logic orders return for another execution of the sequence routine.

According to the mode shift control shown in FIG. 18, when there is a delay in response of the EGR valve 38 during a mode shift to the homogeneous charge combustion mode from the stratified charge combustion mode, a temporarily mode shift is made to the $\Delta \leqq 1$ homogeneous charge combustion mode in place of keeping a shift mode waiting at step S111 in the mode shift control shown in FIG. 17. In consequence, the EGR valve 38 is allowed to have a time to spare before a sufficient reduction in the amount of exhaust gas recirculation is provided as compared with a mode shift directly to the lean homogeneous charge combustion mode, securing stabilized combustibility. In this instance, however, since the output torque somewhat fluctuates, a correction of the ignition timing is made to remove the fluctuations of output torque.

Figure 19:
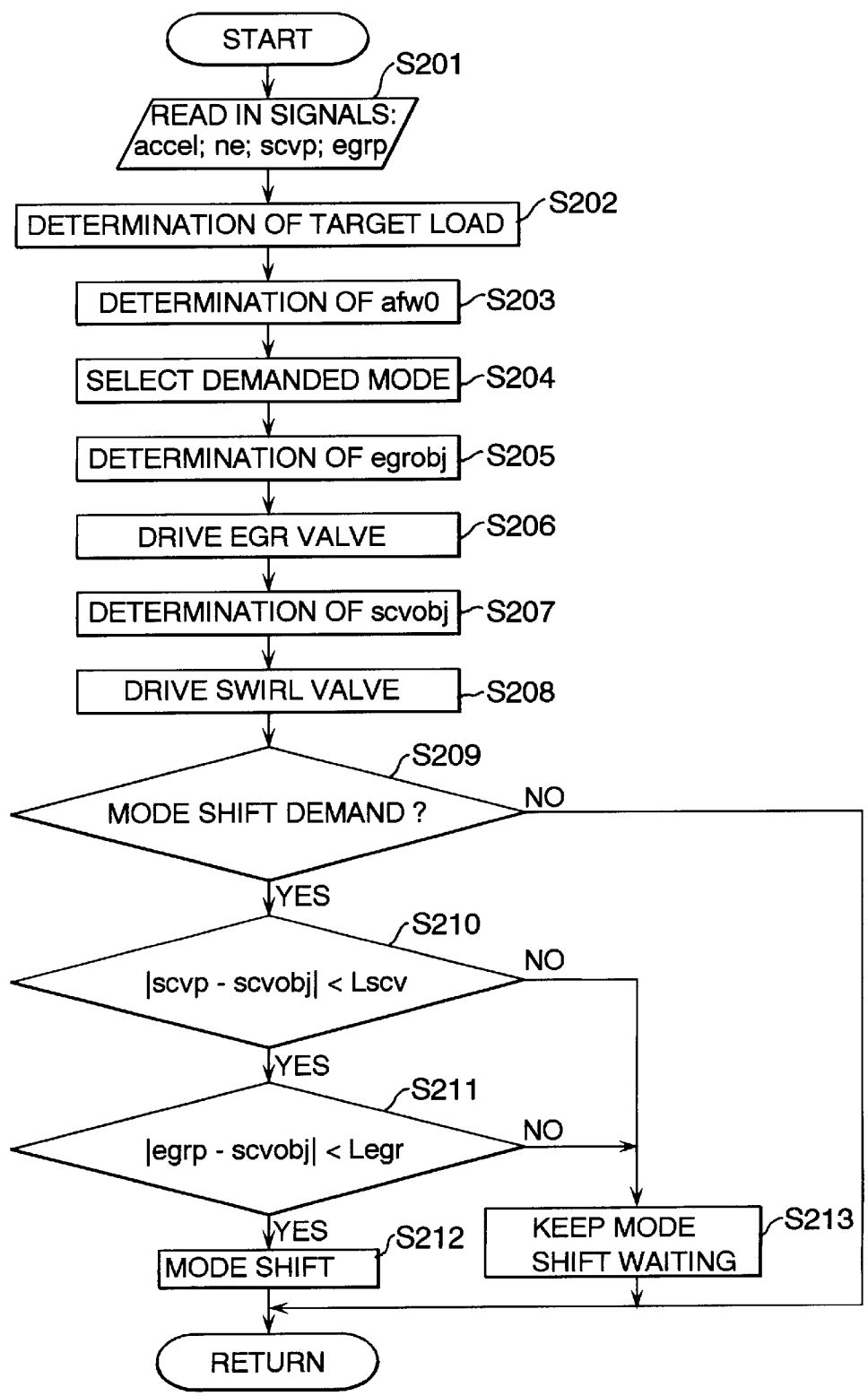
FIG. 19 is a flow chart illustrating a sequence routine of swirl valve and EGR valve control during a shift between combustion modes.

FIG. 19 is a flow chart illustrating a sequence routine of mode shift control in which response delays of both swirl control valve 32 and EGR valve 38 are dealt with. When the flow chart logic commences and control proceeds to a function block ar step S201 where signals representative of accelerator pedal travel accel, engine speed ne, swirl control valve opening scvp, and EGR valve lift egrp are read in. A target engine load and a target air-to-fuel ratio are determined at steps S202 and S203, respectively. Subsequently, one of the combustion modes is selected as a demanded combustion mode at step S204. After determining a target valve lift egrobj of the EGR valve 38 according to the demanded combustion mode and the target engine load at step S205, the EGR valve 38 is driven so as to attain the target valve lift egrobj at step S206. Subsequently, after determining a target opening scvobj of the swirl control valve 32 for the demanded combustion mode at step S207, the swirl control valve 32 is driven so as to attain the target opening scvobj at step S208.

Thereafter, a judgement is made at step S209 as to whether there is a mode shift demand. When there is no mode shift demand, the flow chart logic orders return for another execution of the sequence routine. On the other hand, when there is a mode shift demand, a judgement is made at step S210 as to whether a threshold value or specified permissible value Lscv is exceeded by a swirl control valve opening difference (scvp−scvobj). When the swirl control valve opening difference is still less than the threshold value Lscv, then, another judgement is subsequently made at step S211 as to whether a threshold value or specified permissible value Legr is exceeded by an EGR valve lift difference (egrp−egrobj). When the EGR valve lift difference is still less than the threshold value Legr, then the demanded mode shift is executed at step S212. On the other hand, the swirl control valve opening difference has exceeded the threshold value Lscv or when the EGR valve lift difference has exceeded the threshold value Legr, then the mode shift is kept waiting at step S213.

According to the mode shift control shown in FIG. 19, stabilized combustibility is secured regardless of response delays of both swirl control valve 32 and EGR valve 38.

In the mode shift control illustrated by flow charts in FIGS. 16–19, execution or waiting a mode shift may be determined based on an EGR rate or a difference of a burned gas content of a recirculating exhaust gas to a target burned gas content in place of an EGR valve lift difference with respect to a threshold value.

The engine control system may be installed to engines other than direct injection-spark ignition type. Such engines include an engine equipped with a fuel injector in an intake port which performs lean-burn while generating a swirl in a zone of lower speeds and lower loads and is controlled by a controller adapted to determine a target load based on which throttle opening and the amount of fuel injection are controlled.

It is to be understood that although the present invention has been described with regard to preferred embodiments thereof, various other embodiments and variants may occur to those skilled in the art, which are within the scope and spirit of the invention, and such other embodiments and variants are intended to be covered by the following claims.

What is claimed is:

1. An engine control system for an engine operative in a plurality of engine operation modes different in fuel injection pattern according to engine operating conditions, said engine control system comprising:

intake air flow control means for controlling an intake air flow introduced into a combustion chamber of the engine from an intake passage according to a control value thereof;

engine operating condition monitoring means for monitoring an engine operating condition; and control means for judging based on a change in said engine operating condition whether a mode shift to one of said engine operation modes to another of said engine operation modes is demanded, comparing said control value with a permissible extent of said control value of said intake air flow control means for said one engine operation mode when a specific mode shift between said engine operation modes is demanded, and controlling, when said control value is out of said permissible extent, said intake air flow control means so as to attain a target control value of said intake air flow control means for said one engine operation mode to which said specific mode shift is made while keeping said specific mode shift waiting until said control value reaches said permissible extent.

2. The engine control system as defined in claim 1, wherein said engine is of a type which fuel is injected directly into said combustion chamber, said engine operating modes includes a stratified charge combustion mode in which fuel injection is made in a compression stroke and stratified charge combustion is performed and a homogeneous charge combustion mode in which fuel injection is made in an intake stroke and homogeneous charge combustion is performed, and said control means keeping, when said control value is out of said permissible extent, a mode shift to said stratified charge combustion mode from said homogeneous charge combustion mode waiting until said control value reaches said permissible extent for said stratified combustion charge mode.

3. The engine control system as defined in claim 2, wherein said control means executes a mode shift to said homogeneous charge combustion mode from said stratified charge combustion mode when said control value is judged to be out of said permissible extent for said homogeneous charge combustion mode and continuously performs a correction of ignition timing until said control value reaches within said permissible extent.

4. The engine control system as defined in claim 1, wherein said intake air control means comprises exhaust gas recirculation control means for controlling an amount of exhaust gas admitted into said intake air flow and said control means compares a control value of said exhaust gas recirculation control means with a permissible extent of said control value of said exhaust gas recirculation control means for said one engine operation mode.

5. The engine control system as defined in claim 4, wherein said engine is of a type in which fuel is injected directly into a combustion chamber, said engine operating modes including a stratified charge combustion mode in which fuel injection is made in a compression stroke and stratified charge combustion is performed and a homogeneous charge combustion mode in which fuel injection is made in an intake stroke and homogeneous charge combustion is performed, and said control means keeping, when said control value is judged to be out of said permissible extent, a specific mode shift to said homogeneous charge combustion mode from said stratified charge combustion mode waiting.

6. An engine control system for an engine operative in a plurality of engine operation modes different in fuel injection pattern according to engine operating conditions, said engine control system comprising:

exhaust gas recirculation control means for controlling an amount of exhaust gas admitted into an intake air flow introduced into a combustion chamber of said engine according to a control value of aid exhaust gas recirculation control means;

engine operating condition monitoring means for monitoring an engine operating condition; and control means for judging based on a change in said engine operating condition whether a mode shift to one of said engine operation modes from another engine operation mode is demanded, judging whether said control value is within a permissible extent of said control value of said exhaust gas recirculation control means when it is judged that a mode shift is demand, and controlling, when said control value is judged to be out of said permissible extent when it is judged that a specific mode shift is demand, said exhaust gas recirculation control means so as to attain a target control value of said exhaust gas recirculation control means in a demanded engine operation mode of said specific mode shift while keeping said specific mode shift waiting until said control value reaches within said permissible extent.

7. The engine control system as defined in claim 6, wherein said engine is a type in which fuel is injected directly into said combustion chamber, said engine operating modes including a stratified charge combustion mode in which fuel injection is made in a compression stroke and stratified charge combustion is performed and a homogeneous charge combustion mode in which fuel injection is made in an intake stroke and homogeneous charge combustion is performed, and said control means keeping a specific mode shift to said homogeneous charge combustion mode from said stratified charge combustion mode waiting when said control value is judged to be out of said limit value.

8. The engine control system as defined in claim 7, wherein, while it is judged that a mode shift to said stratified charge combustion mode from said homogeneous charge combustion mode is demanded, said control means executes said mode shift to said stratified charge combustion mode from said homogeneous charge combustion mode when said control value is judged to be out of said permissible extent for said stratified charge combustion mode and continuously performs a correction of ignition timing until said control value reaches within said permissible extent.

9. An engine control system for an engine of a type in which fuel in injected directly into a combustion chamber and which is changeable in operation modes between at least a stratified charge combustion mode in which fuel injection is made in a compression stroke and stratified charge combustion is performed with a lean fuel mixture and a lean homogeneous charge combustion mode in which fuel injection is made in an intake stroke and homogeneous charge combustion is performed with a fuel mixture enriched more than said lean fuel mixture with which said stratified charge combustion is performed by leaner than a stoichiometric fuel mixture according to engine operating conditions, said engine control system comprising:

exhaust gas recirculation control means for admitting an amount of exhaust gas controlled according to a control value of said exhaust gas recirculation control means into an intake air flow introduced into said combustion chamber;

engine operating condition monitoring means for monitoring an engine operating condition; and control means for judging based on a change in said engine operating condition whether a mode shift to one of said operation modes to another operation mode is demanded, judging whether said control value is within a permissible extent of said control value of said exhaust gas recirculation control means for a demanded operation mode when said mode shift is demanded, and controlling, when said control value is judged to be out of said permissible extent while it is judged that a specific mode shift to said lean homogeneous charge combustion mode from said stratified charge combustion mode is demanded, said exhaust gas recirculation control means so as to attain an air-to-fuel ratio equal to or smaller than a stoichiometric air-to-fuel ratio and continuously performing a correction of ignition timing until said control value reaches within said permissible extent while performing said specific mode shift.

* * * * *